US012593125B2

(12) United States Patent
Shim

(10) Patent No.: US 12,593,125 B2
(45) Date of Patent: Mar. 31, 2026

(54) IMAGE SENSOR SUPPORTING AF FUNCTION AND METHOD OF OPERATING THE SAME

(71) Applicant: Samsung Electronics Co., Ltd., Suwon-si (KR)

(72) Inventor: Eun Sub Shim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 130 days.

(21) Appl. No.: 18/490,250

(22) Filed: Oct. 19, 2023

(65) Prior Publication Data

US 2024/0147063 A1 May 2, 2024

(30) Foreign Application Priority Data

Oct. 27, 2022 (KR) ........................ 10-2022-0140376

(51) Int. Cl.
H04N 23/67 (2023.01)
H04N 25/40 (2023.01)
(Continued)

(52) U.S. Cl.
CPC ........... H04N 23/672 (2023.01); H04N 23/67 (2023.01); H04N 25/40 (2023.01); H04N 25/51 (2023.01);
(Continued)

(58) Field of Classification Search
CPC ...... H04N 23/67; H04N 23/672; H04N 25/40; H04N 25/51; H04N 25/533; H04N 25/583;
(Continued)

(56) References Cited

U.S. PATENT DOCUMENTS

| | | | |
|---|---|---|---|
| 8,729,451 B2 | 5/2014 | Bikumandla | |
| 9,019,410 B2 | 4/2015 | Lim et al. | |

(Continued)

OTHER PUBLICATIONS

European Office Action dated Jun. 26, 2025 issued in European Patent Application No. 23 204 599.7-1207.

(Continued)

*Primary Examiner* — Lin Ye
*Assistant Examiner* — Chriss S Yoder, III
(74) *Attorney, Agent, or Firm* — Harness, Dickey & Pierce, P.L.C.

(57) ABSTRACT

An image sensor includes a first pixel group, a second pixel group arranged in a same column and row as the first pixel group, a first analog-to-digital converter and a second analog-to-digital converter corresponding to the first pixel group and the second pixel group, respectively and configured to process pixel signals output from the first pixel group and the second pixel group, and a switching circuit configured to selectively transmit a first pixel signal output from the first pixel group and a second pixel signal output from the second pixel group to the first analog-to-digital converter or the second analog-to-digital converter. While the first analog-to-digital converter is connected to the first pixel group to process the first pixel signal, the second analog-to-digital converter is connected to the second pixel group to process the second pixel signal. Accordingly, auto-focus information may be more effectively obtained.

18 Claims, 24 Drawing Sheets

(51) Int. Cl.

| | |
|---|---|
| *H04N 25/51* | (2023.01) |
| *H04N 25/533* | (2023.01) |
| *H04N 25/59* | (2023.01) |
| *H04N 25/704* | (2023.01) |
| *H04N 25/77* | (2023.01) |
| *H04N 25/772* | (2023.01) |
| *H04N 25/778* | (2023.01) |
| *H04N 25/78* | (2023.01) |

(52) U.S. Cl.
CPC ........... *H04N 25/533* (2023.01); *H04N 25/59* (2023.01); *H04N 25/704* (2023.01); *H04N 25/77* (2023.01); *H04N 25/772* (2023.01); *H04N 25/778* (2023.01); *H04N 25/78* (2023.01)

(58) Field of Classification Search
CPC ...... H04N 25/59; H04N 25/704; H04N 25/77; H04N 25/772; H04N 25/778; H04N 25/78; H10F 39/8063
See application file for complete search history.

(56) References Cited

U.S. PATENT DOCUMENTS

| | | | |
|---|---|---|---|
| 9,854,186 | B2 | 12/2017 | Johnson et al. |
| 9,894,304 | B1 | 2/2018 | Smith et al. |
| 10,798,322 | B2 | 10/2020 | Smith et al. |
| 10,893,210 | B2 | 1/2021 | Sakaguchi et al. |
| 11,463,648 | B1 | 10/2022 | Xu et al. |
| 2013/0048831 | A1 | 2/2013 | Bikumandla |
| 2013/0087683 | A1* | 4/2013 | Mo ........................ H04N 25/46 |
| | | | 250/208.1 |
| 2013/0141619 | A1 | 6/2013 | Lim et al. |
| 2016/0269669 | A1* | 9/2016 | Kim ...................... H04N 25/70 |
| 2017/0230593 | A1 | 8/2017 | Johnson et al. |
| 2019/0082125 | A1 | 3/2019 | Smith et al. |
| 2020/0204751 | A1 | 6/2020 | Lule |
| 2022/0060647 | A1 | 2/2022 | Lee et al. |
| 2022/0337771 | A1 | 10/2022 | Yun et al. |
| 2022/0337777 | A1 | 10/2022 | Shim et al. |

OTHER PUBLICATIONS

Extended European Search Report dated Mar. 26, 2024 issued in European Patent Application No. 23204599.7-1208.

* cited by examiner

FIG.11
| EIT_s for ULCG |
|:---:|
| $\dfrac{\text{T\_short}}{\text{T\_long}} \cong \dfrac{\text{ULCG}}{\text{HCG}} \cong \dfrac{1}{256}$ |
| $\dfrac{\text{ULCG}}{\text{HCG}} \times \dfrac{1}{a} < \dfrac{\text{T\_short}}{\text{T\_long}} < \dfrac{\text{ULCG}}{\text{HCG}} \times \dfrac{a}{1}$ |
FIG.12
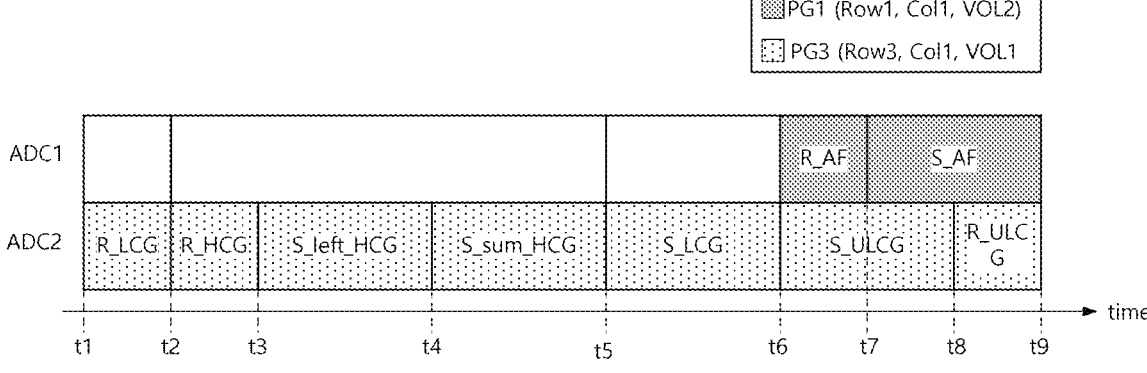
FIG.13
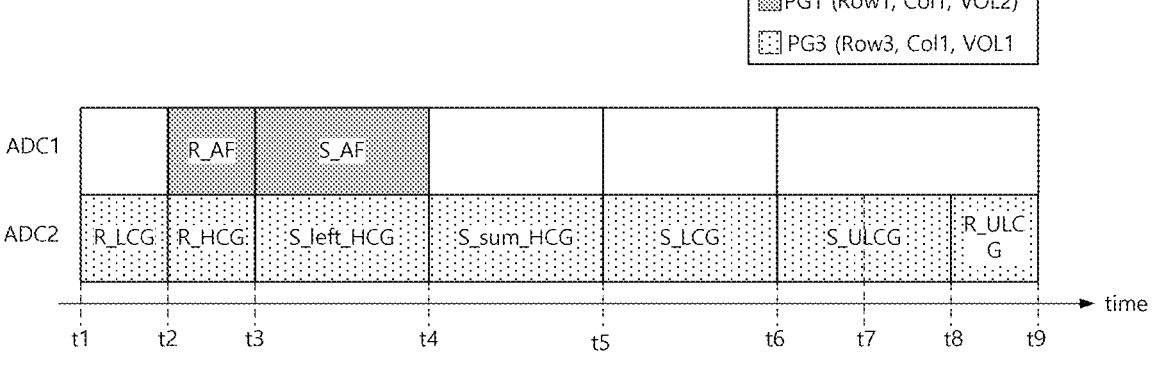

| EIT_s for ULCG |
|:---:|
| $\dfrac{T\_short}{T\_long} = \dfrac{ULCG}{LCG} = \dfrac{1}{64}$ |
| $\dfrac{ULCG}{LCG} \times \dfrac{1}{b} < \dfrac{T\_short}{T\_long} < \dfrac{ULCG}{LCG} \times \dfrac{b}{1}$ |

FIG.18B

| EIT_s for LCG |
|---|
| $\dfrac{T\_short}{T\_long} \approx \dfrac{LCG}{HCG} \approx \dfrac{1}{4}$ |
| $\dfrac{LCG}{HCG} \times \dfrac{1}{c} < \dfrac{T\_short}{T\_long} < \dfrac{LCG}{HCG} \times \dfrac{c}{1}$ |

PG1B (Row1, Col1, VOL2)

PG3B (Row3, Col1, VOL1)

| EIT_s for HCG |
|---|
| $\dfrac{1}{d} < \dfrac{T\_short}{T\_long} < 1$ |

1

IMAGE SENSOR SUPPORTING AF FUNCTION AND METHOD OF OPERATING THE SAME

CROSS-REFERENCE TO RELATED APPLICATION(S)

This application claims benefit of priority to Korean Patent Application No. 10-2022-0140376 filed on Oct. 27, 2022, in the Korean Intellectual Property Office, the disclosure of which is incorporated herein by reference in its entirety.

BACKGROUND

Various example embodiments relate to image sensors, and more particularly, to image sensors providing an autofocusing (AF) function.

Image sensors may be classified as charge coupled device (CCD) image sensors, complementary metal-oxide semiconductor (CMOS) image sensors (CIS), and/or the like. CMOS image sensors include pixels that have CMOS transistors and that convert light energy into an electrical signal using a photoelectric conversion element (such as a photodiode) included in each pixel. CMOS image sensors obtain information on a captured image using the electrical signal generated by each pixel.

An autofocusing (hereinafter referred to as "AF") function may be provided to improve the quality of images of external objects. For example, an image sensor supporting a phase detection autofocus (PDAF) may be used to rapidly perform an AF function.

SUMMARY

Various example embodiments provide an image sensor for more effectively providing an AF function.

According to some example embodiments, an image sensor includes: a first pixel group; a second pixel group in a same column as the first pixel group; a first analog-to-digital converter and a second analog-to-digital converter corresponding to the first pixel group and the second pixel group and configured to process pixel signals output from the first pixel group and the second pixel group, respectively; and a switching circuit configured to selectively transmit a first pixel signal that is output from the first pixel group and a second pixel signal that is output from the second pixel group, to the first analog-to-digital converter or the second analog-to-digital converter. The image sensor is configured such that while the first analog-to-digital converter is connected to the first pixel group to process the first pixel signal, the second analog-to-digital converter may be connected to the second pixel group to process the second pixel signal.

Alternatively or additionally according to some example embodiments, an image sensor includes: a pixel array including a plurality of pixel groups arranged along the same column; an analog-to-digital converting block including a plurality of analog-to-digital converters configured to receive pixel signals that are output from the plurality of pixel groups and to convert the received pixel signals into digital signals; and a switching circuit configured to connect the plurality of pixel groups to the plurality of analog-to-digital converters. The image sensor is configured to operate such that a first period in which among the plurality of analog-to-digital converters a first analog-to-digital converter is connected a selected pixel group among the plurality of pixel groups so as to perform a processing operation may at least partially overlap a second period in which among the plurality of analog-to-digital converters a second analog-to-digital converters is connected to an adjacent pixel group that is in a row different from a row of the selected pixel group so as to perform a processing operation.

Alternatively or additionally according to some example embodiments, a method of operating an image sensor includes: obtaining image information on a selected pixel group from among a plurality of pixel groups; and obtaining phase information on the selected pixel group using an adjacent pixel group arranged in the same column as the selected pixel group and arranged in a row different from a row of the selected pixel group from among the plurality of pixel groups. A period in which the image information on the selected pixel group is obtained may at least partially overlaps a period in which the phase information on the selected pixel group is obtained.

BRIEF DESCRIPTION OF DRAWINGS

The above and other aspects, features, and advantages of the present disclosure will be more clearly understood from the following detailed description, taken in conjunction with the accompanying drawings.

FIGS. 7A to 7C are diagrams illustrating examples of a state of connection between pixel groups and analog-to-digital converters when a TCG operation is performed.

FIG. 11 is a diagram illustrating an example of a time length of a short effective integration time compared with a long effective integration time.

FIG. 12 is a schematic timing diagram illustrating another example in which the image sensor of FIG. 1 performs a TCG operation.

FIG. 13 is a schematic timing diagram illustrating another example in which the image sensor of FIG. 1 performs a TCG operation.

3

Figure 1:
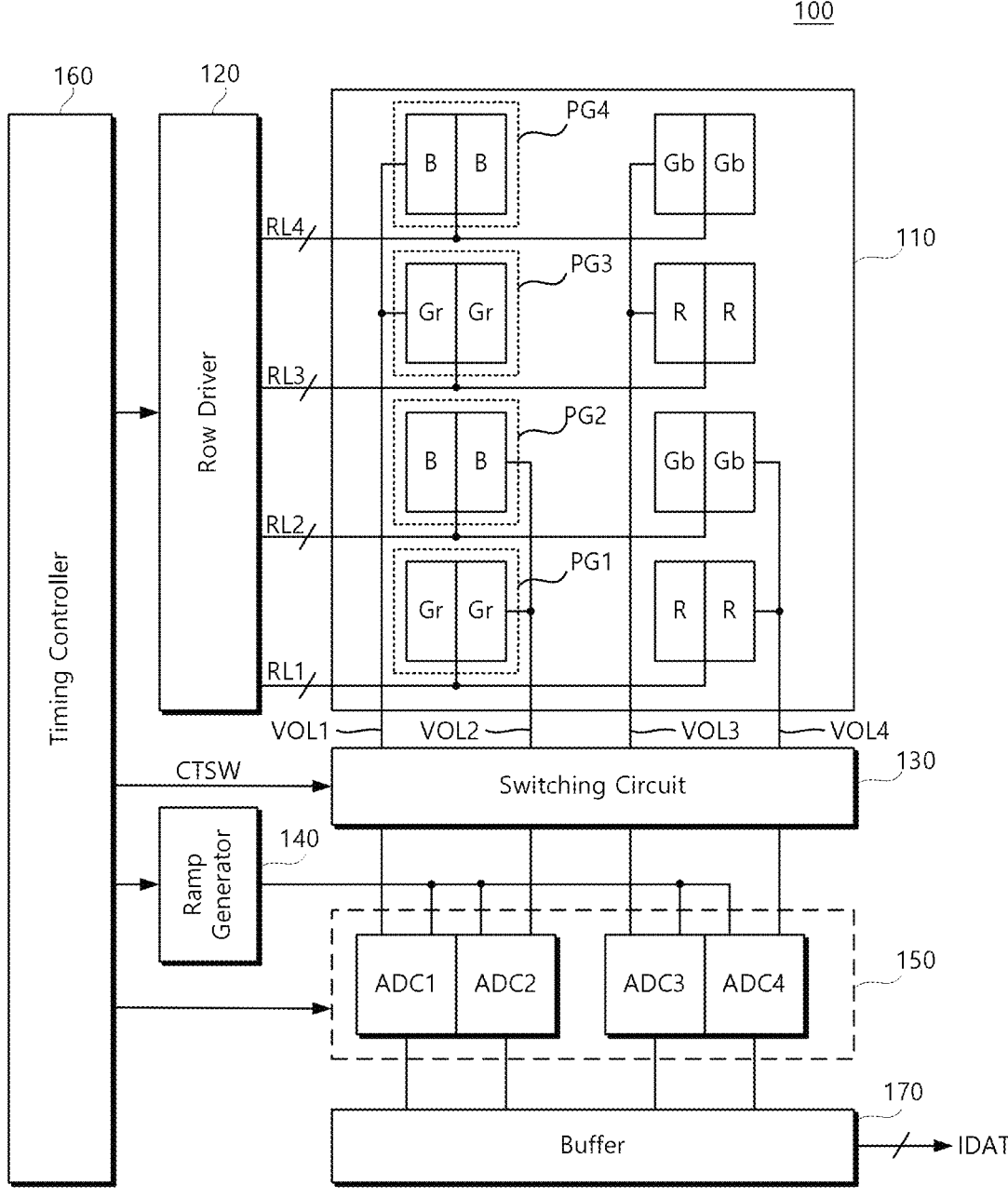
FIG. 1 is a diagram illustrating an image sensor according to some example embodiments.
Figure 16:
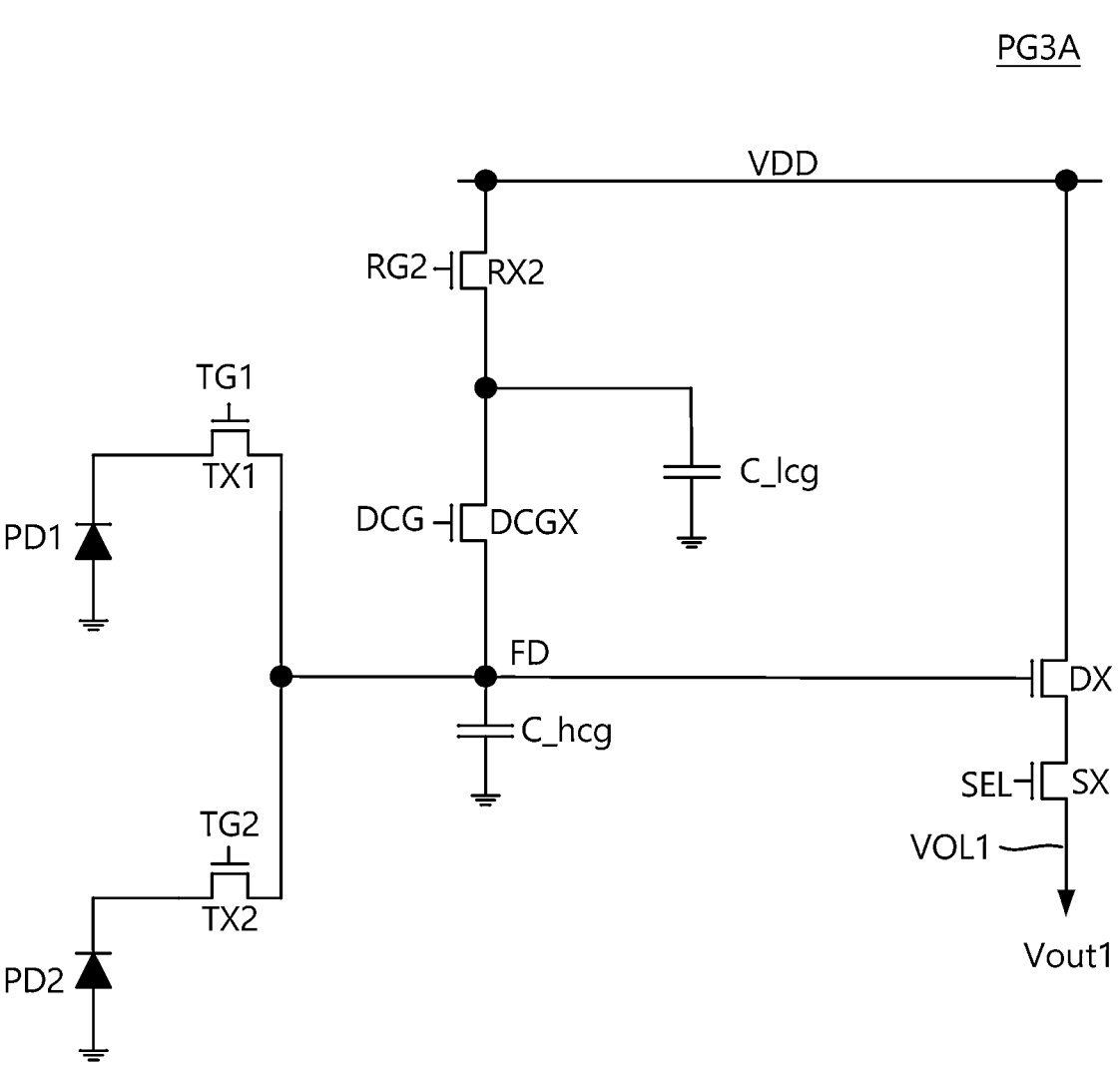

FIG. 16 is a diagram illustrating another example of a pixel group, including an HCG capacitor and an LCG capacitor, of the image sensor of FIG. 1.

Figure 18B:
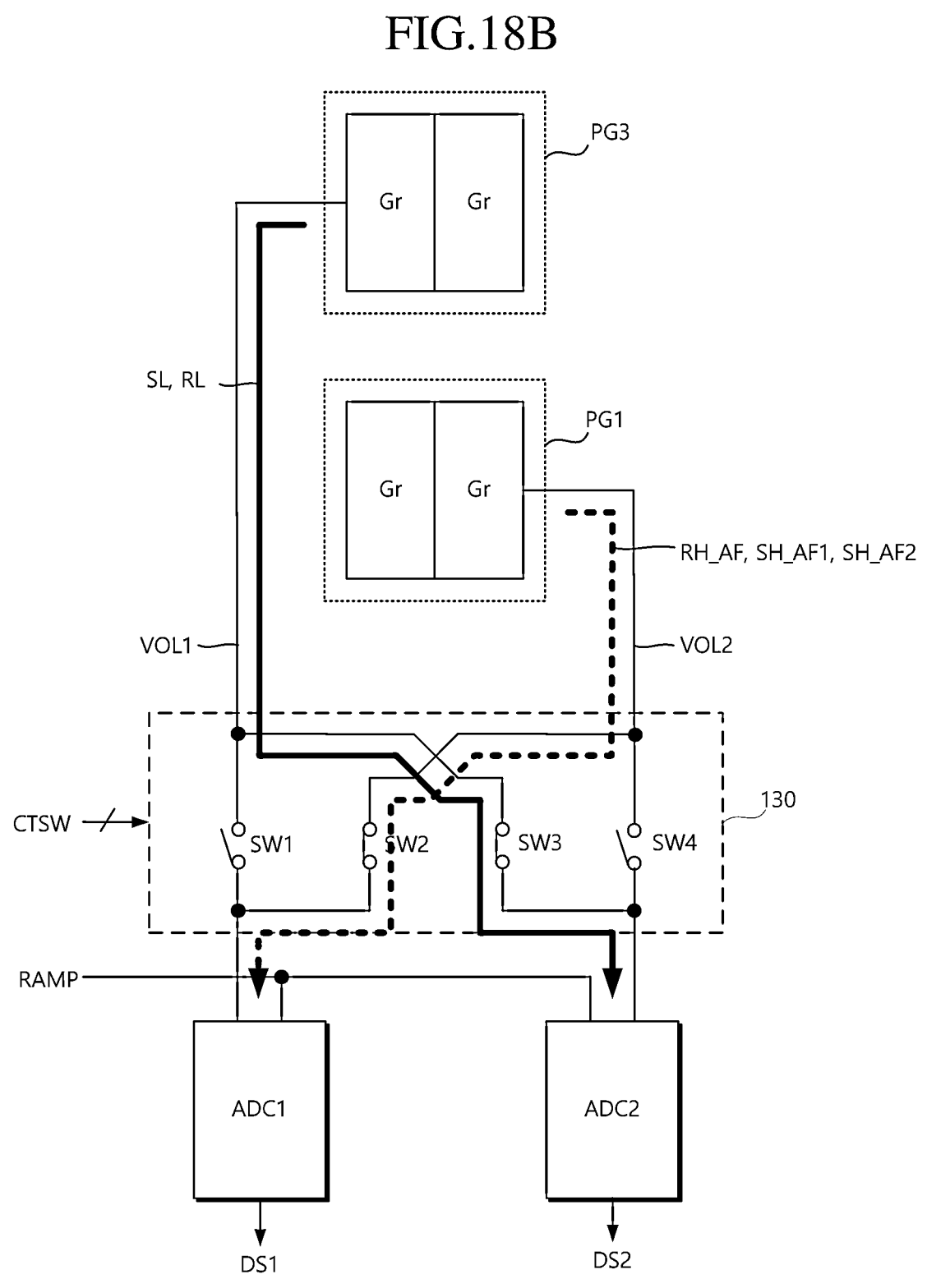

FIGS. 17 and 18A-C are diagrams provided to describe an example of a dual conversion gain (DCG) operation of the pixel group of FIG. 16.

Figure 18A:
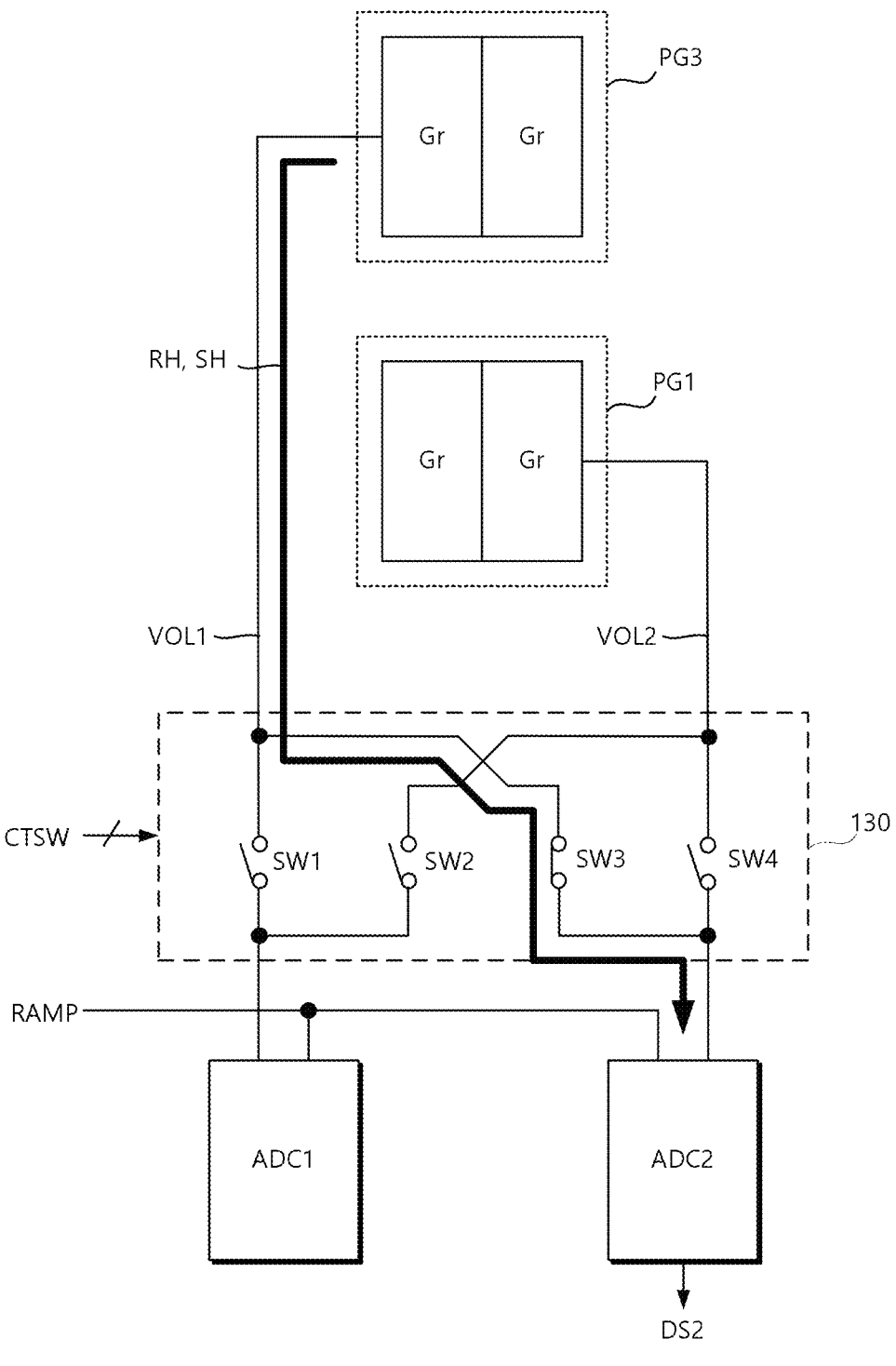
Figures 18C, 19:
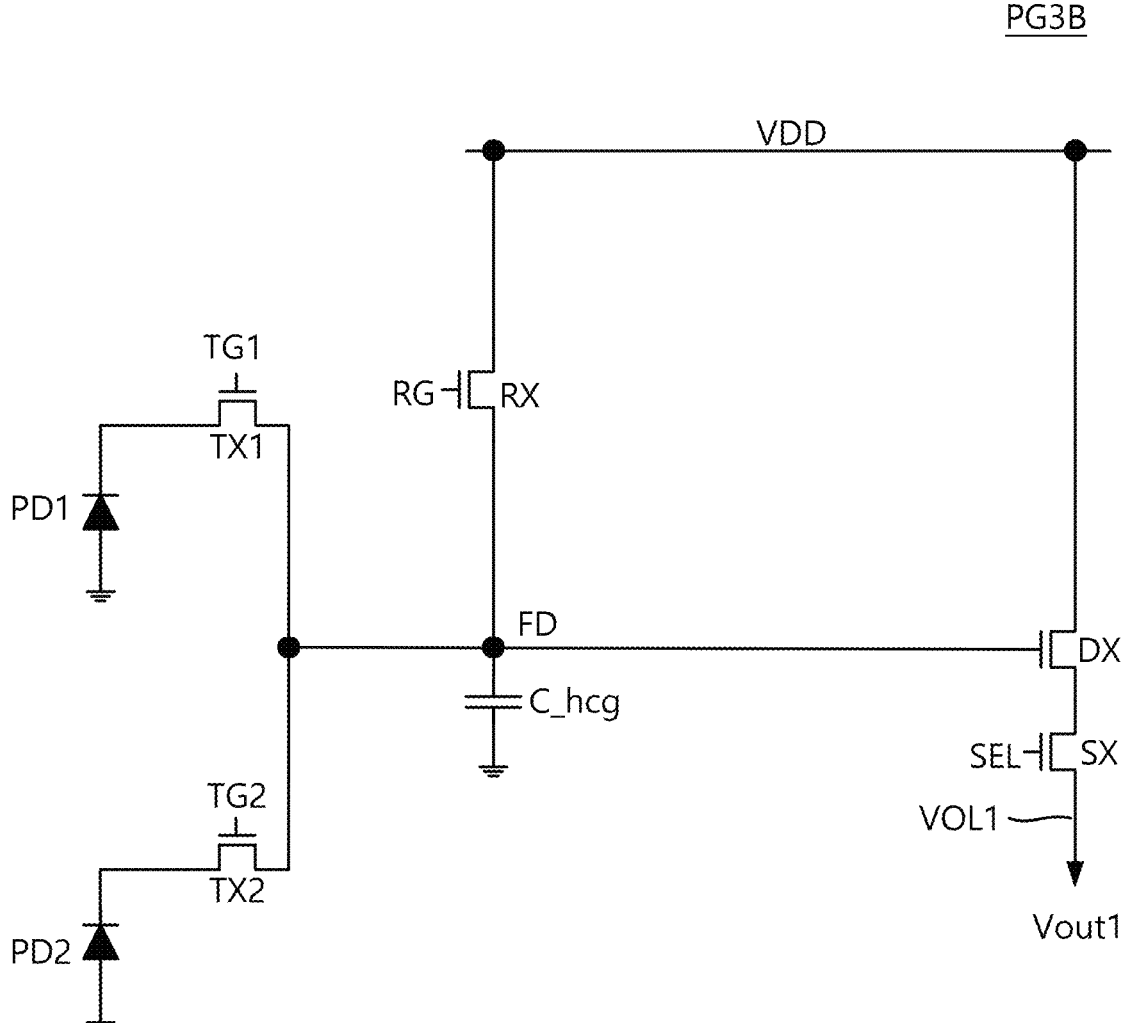

FIG. 19 is a diagram illustrating another example of a pixel group, including an HCG capacitor, of the image sensor of FIG. 1.

Figure 20:
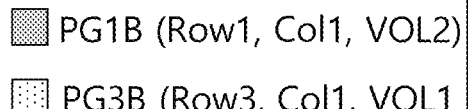
Figure 20:
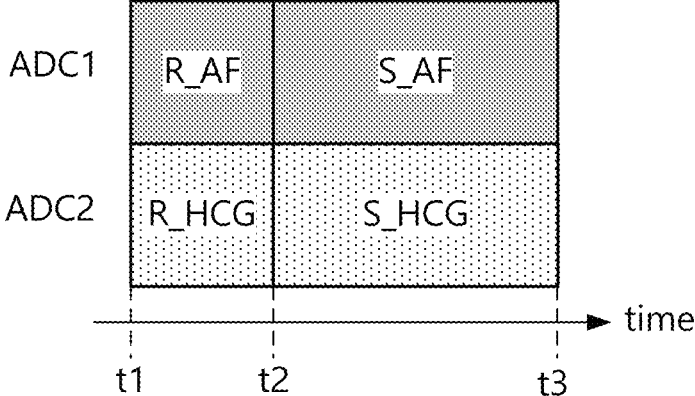
Figure 21:
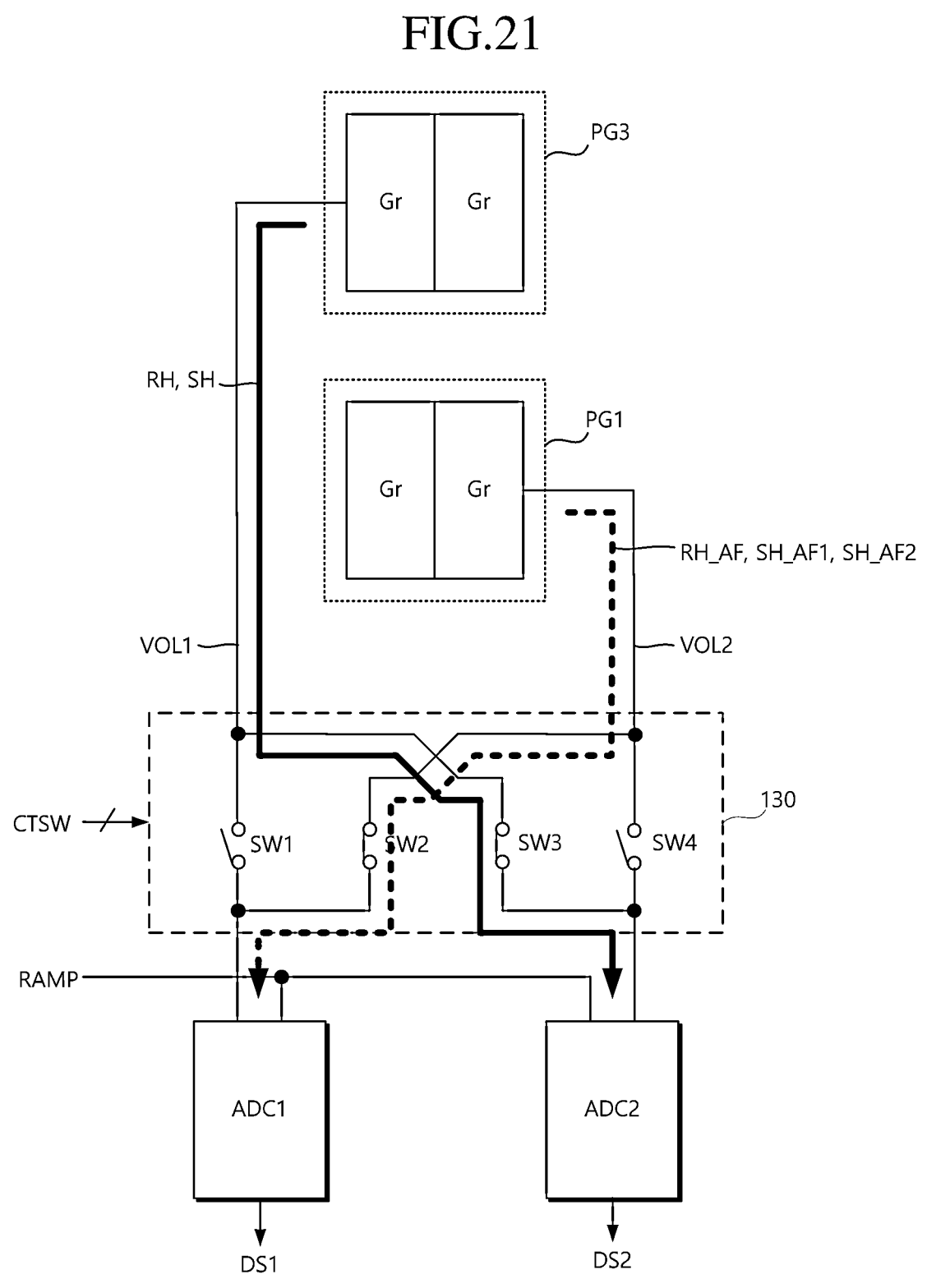

FIGS. 20 to 22 are diagrams provided to describe an example of an SCG operation of the pixel group of FIG. 19.

DETAILED DESCRIPTION

Hereinafter, various example embodiments will be described with reference to the accompanying drawings.

FIG. 1 is a diagram illustrating an image sensor 100 according to some example embodiments.

The image sensor 100 according to some example embodiments may be implemented such that at least two analog-to-digital converters correspond to a single pixel group. While one analog-to-digital converter processes a pixel signal for a selected pixel group, another analog-to-digital converter may process a pixel signal for another pixel group. In this case, the selected pixel group and the other pixel group may be disposed or arranged in the same column, but may be disposed or arranged in different rows. Accordingly, AF information on the selected pixel group may be more effectively obtained.

Referring to FIG. 1, the image sensor 100 may include a pixel array 110, a row driver 120, a switching circuit 130, a ramp signal generator 140, an analog-to-digital converting block (hereinafter referred to as an "ADC block") 150, a timing controller 160, and a buffer 170.

The pixel array 110 may include a plurality of pixels arranged in a matrix of rows and columns. Each of the plurality of pixels may include a photoelectric conversion element. For example, the photoelectric conversion element may include one or more of a photodiode, a phototransistor, a photogate, or a pinned photodiode. Each of the plurality of pixels may sense light using a photoelectric conversion element and may convert the sensed light into an electrical signal (hereinafter referred to as a "pixel signal"). The pixel signal may include image information for generating image data and/or phase information used to calculate a phase difference.

The pixel array 110 may include a plurality of pixel groups PGs. Each pixel group PG may include at least two pixels sharing a single microlens. As an example, in FIG. 1, the pixel group PG is illustrated as including two pixels, and two pixels may share a single micro lens. Pixels included in a pixel group PG may share a single floating diffusion region. However, this is only an example, and the pixels included in the pixel group PG may share a plurality of floating diffusion regions. Moreover, as an example, the pixel array 110 is illustrated as including pixel groups of four rows and two columns (for example, 4-by-2), but example embodiments are not limited thereto.

The pixel group PG may include pixels of the same color. For example, the pixel groups PGs may include a red pixel R converting light in a red spectrum region into an electric signal, green pixels Gr and Gb converting light in a green spectrum region into an electrical signal, or a blue pixel B converting light in a blue spectrum region into an electrical signal. For example, pixels constituting the pixel array 110 may be arranged in a Bayer pattern; however, example embodiments are not limited thereto.

Pixel groups PGs disposed along a single column may be alternately connected to two output lines VOL. For example, among pixel groups PG1 to PG4, some pixel groups PG3 and PG4 disposed in a first column may be connected to a first output line VOL1, and other pixel groups PG1 and PG2 may be connected to a second output line VOL2. Similarly, among pixel groups arranged in a second column, some pixel groups may be connected to a third output line VOL3, and other pixel groups may be connected to a fourth output line VOL4.

The row driver 120 may select and drive a row of the pixel array 110. The row driver 120 may decode an address and/or a control signal that is generated by the timing controller 160 so as to generate control signals for selecting and driving a row of the pixel array 110. For example, the control signals may include one or more of a signal for selecting a pixel, a signal for resetting a floating diffusion region, a signal for selecting an output line, or the like.

The switching circuit 130 may control a path through which an analog signal (for example, a pixel signal), output from the pixel array 110, is transmitted to the ADC block 150.

In some example embodiments, the switching circuit 130 may set a path such that a single pixel group PG is connected to two analog-to-digital converters. For example, when performing a triple conversion gain (hereinafter referred to as "TCG") operation in which a pixel group operates in a high conversion gain (hereinafter referred to as "HCG") mode, a low conversion gain (hereinafter referred to as "LCG") mode, and an ultra-low conversion gain (hereinafter referred to as "ULCG") during a readout time of a single frame, the switching circuit 130 may set a path such that a single pixel group PG is connected to two analog-to-digital converters.

For example, the switching circuit 130 may set a connection path such that a selected pixel group is connected to a second analog-to-digital converter 152 in the HCG mode, is connected to a first analog-to-digital converter 151 in the LCG mode, and is connected to the second analog-to-digital converter 152 in the ULCG mode. Accordingly, a high dynamic range (HDR) may be implemented.

In addition, in some example embodiments, the switching circuit 130 may set a path such that while a selected pixel group is connected to a first analog-to-digital converter, a pixel group in the same row and/or the same column as a selected pixel group is connected to a second analog-to-digital converter. In some example embodiments, while the first analog-to-digital converter connected to the selected pixel group processes a pixel signal including image information corresponding to the selected pixel group, the second analog-to-digital converter may process a pixel signal including phase information corresponding to the selected pixel group.

For example, in the ULCG mode, the switching circuit 130 may connect a selected pixel group to a first analog-to-digital converter ADC1 and may connect another pixel group to a second analog-to-digital converter ADC2. The selected pixel group and the other pixel group may be disposed in the same column and in different rows. The selected pixel group may output a pixel signal including image information in the ULCG mode, and the first analog-to-digital converter ADC1 may process the pixel signal including the image information. The other pixel group may output a pixel signal including phase information in the ULCG mode, and the second analog-to-digital converter ADC2 may process the pixel signal including the phase information. As described above, while a processing operation on the image information in the ULCG mode is performed, a processing operation on the phase information in the ULCG mode may also be performed to effectively obtain AF information.

The ramp signal generator 140 may generate a ramp signal. The ramp signal generator 140 may operate under the control of the timing controller 160. For example, the ramp signal generator 140 may operate under a control signal such as a ramp enable signal and/or a mode signal. For example, when the ramp enable signal is activated, the ramp signal generator 140 may generate a ramp signal having a slope set based on the mode signal.

The ADC block 150 may convert an analog signal (for example, a pixel signal) that is output from the pixel array 110 into a digital signal. The ADC block 150 may include, for example, four analog-to-digital converters ADC1 to ADC4. For example, the first and second analog-to-digital converters ADC1 and ADC2 may correspond to pixel groups disposed in a first column, and the third and fourth analog-to-digital converters ADC3 and ADC4 may correspond to pixel groups disposed in a second column.

Each analog-to-digital converter may include a comparator and a counter. For example, the comparator may compare a pixel signal that is output through a corresponding output line (for example, one of VOL1 to VOL4) with a ramp signal RAMP, and may output a comparison result. For example, the comparator COMP may operate based on a correlated double sampling (CDS) technique. The counter may count a comparison result signal depending on a counter clock signal and may output the counted comparison result signal as a digital signal.

The timing controller 160 may generate a control signal and/or a clock for controlling operations and/or timings of the row driver 120, the switching circuit 130, the ramp signal generator 140, and the ADC block 150.

The buffer 170 may store the digital signal output from the ADC block 150, and may sense and amplify the stored digital signal. For example, the buffer 170 may include memories and a sense amplifier. The memories may store a digital signal output from a corresponding analog-to-digital converter. The sense amplifier may sense and amplify the stored digital signal, and may output the amplified digital signal as image data IDAT.

As described above, the image sensor 100 according to some example embodiments may be implemented such that at least two analog-to-digital converters correspond to a single pixel group. In some example embodiments, while a pixel signal including image information may be processed by one analog-to-digital converter, a pixel signal including phase information may be processed by another analog-to-digital converter. In this case, the pixel signal including the image information and the pixel signal including the phase information may be generated by pixel groups arranged in the same column and different rows, respectively. As a result, the image sensor 100 according to some example embodiments may more effectively obtain AF information.

Figure 2:
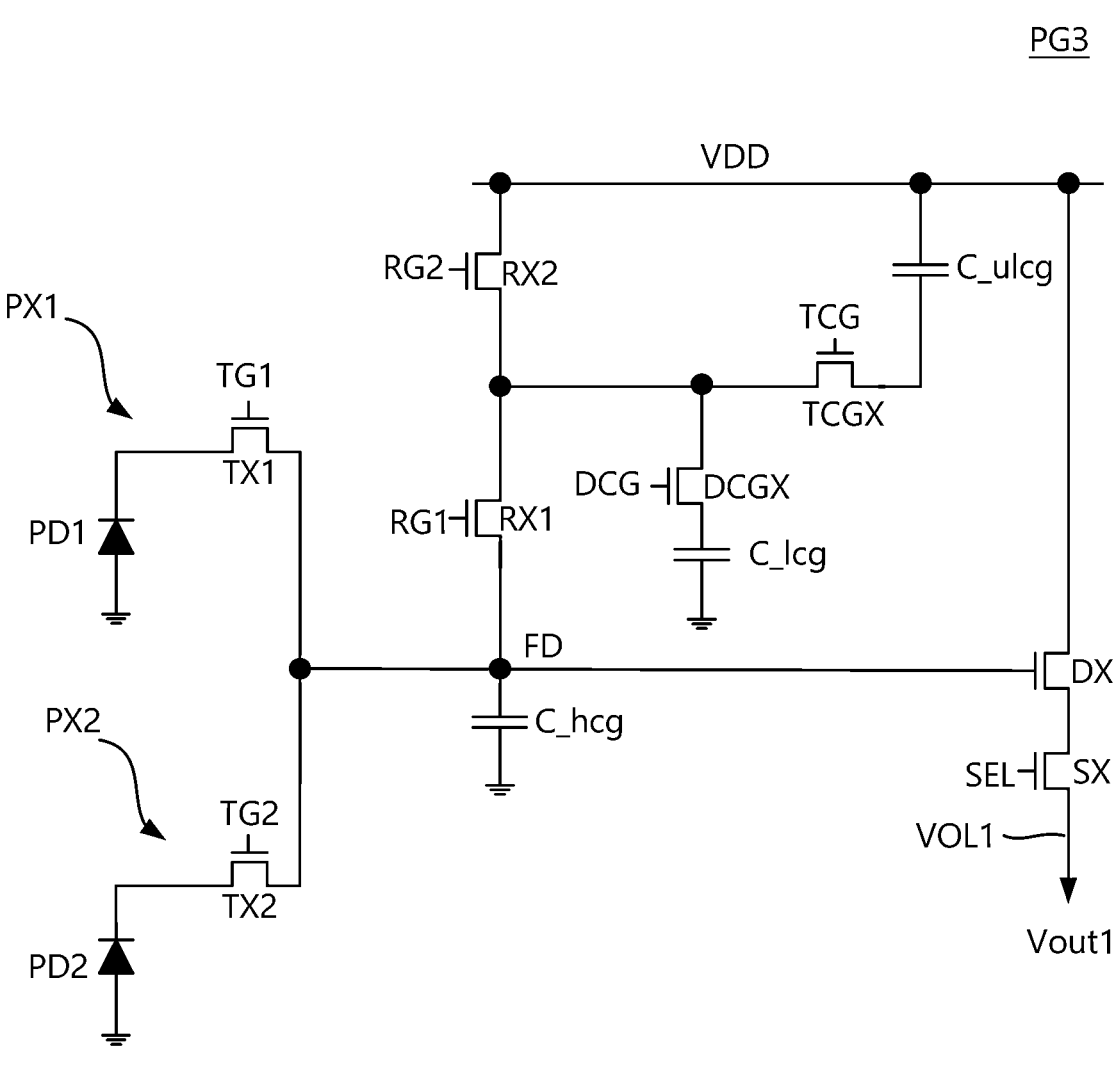
FIG. 2 is a circuit diagram illustrating an example of a pixel group of FIG. 1.

FIG. 2 is a circuit diagram illustrating an example of a pixel group of FIG. 1. As an example, the third pixel group PG3 is illustrated in FIG. 2. FIGS. 3A to 3D are diagrams illustrating an example in which a floating diffusion region FD of the third pixel group PG3 is expanded depending on a mode.

Referring to FIG. 2, the third pixel group PG3 may include photoelectric conversion elements PD1 and PD2, transfer transistors TX1 and TX2, a dual conversion transistor DCGX, a triple conversion transistor TCGX, reset transistors RX1 and RX2, a driving transistor DX, and a select transistor SX. Each of the first and second photoelectric conversion elements PD1 and PD2 may be the same type of photoelectric conversion elements, or may be different from one another. Each of the transfer transistors TX1 and TX2 may have the same, or different, electrical properties (such as one or more of threshold voltages, drive currents, etc.) Each of the reset transistors RX1 and RX2 may have the same, or different, electrical properties.

The first pixel PX1 may include the first photoelectric conversion element PD1 and the first transfer transistor TX1. The second pixel PX2 may include the second photoelectric conversion element PD2 and the second transfer transistor TX2. Each of the first and second pixels PX1 to PX2 may share a dual conversion transistor DCGX, a triple conversion transistor TCGX, reset transistors RX1 and RX2, a driving transistor DX, a select transistor SX, and a floating diffusion region FD.

The first photoelectric conversion element PD1 of the first pixel PX1 may be disposed on a first side such as a left side of the third pixel group PG3, and the second photoelectric conversion element PD2 of the second pixel PX2 may be disposed on a second side such as a right side of the third pixel PG3. The first pixel PX1 and the second pixel PX2 may generate first and second pixel signals including phase information used to detect a phase difference, respectively, and may output the generated first and second pixel signals through the first output line VOL1.

The first and second transfer transistors TX1 and TX2 may be turned on or off in response to first and second transfer signals TG1 and TG2 provided from the row driver 120, respectively. The first and second transfer transistors TX1 and TX2 may transfer charges that are accumulated in the first and second photoelectric conversion elements PD1 and PD2 into the floating diffusion region FD, respectively.

A voltage level of the floating diffusion region FD may be determined depending on an amount of charges stored in a capacitor connected to the floating diffusion region FD. For example, the amount of the charges stored in the capacitor connected to the floating diffusion region FD may be converted into a voltage. A conversion gain may be determined by capacitance of the floating diffusion region FD, and may be in inverse proportion to the magnitude of the capacitance. When the capacitance of the floating diffusion region FD is increased, the conversion gain may be decreased. Meanwhile, when the capacitance is decreased, the conversion gain may be increased.

The reset transistors RX1 and RX2 may reset the floating diffusion region FD in response to the reset signals RX1 and RX2, respectively. For example, the first reset transistor RX1 and the second reset transistor RX2 may be serially connected between a power supply voltage VDD and the floating diffusion region FD. When the first and second reset signals RX1 and RX2 are activated, the first and second reset transistors RX1 and RX2 may be turned on and the power supply voltage VDD may be transferred to the floating diffusion region FD. In this case, the voltage level of the floating diffusion region FD may be reset to the power supply voltage VDD.

A gate of the driving transistor DX may be connected to the floating diffusion region FD and may serve as a source follower amplifier. For example, the driving transistor DX may amplify a potential variation of the floating diffusion region FD, and may transfer the amplified potential variation to an output line VOL via the select transistor SX.

The select transistor SX may be used to select a pixel and/or a pixel group to be read in units of rows. The select transistor SX may be driven by a selection signal SEL provided in units of rows. When the select transistor SX is turned on, a potential of the floating diffusion region FD may be amplified and transferred to a drain of the select transistor SX through the driving transistor DX.

According to some example embodiments, a pixel group may operate to provide various modes depending on the intensity of light. For example, a dual conversion gain transistor DCGX and a triple conversion gain transistor TCGX of a pixel group may be selectively turned on or turned off depending on an operation mode.

Figure 3A:
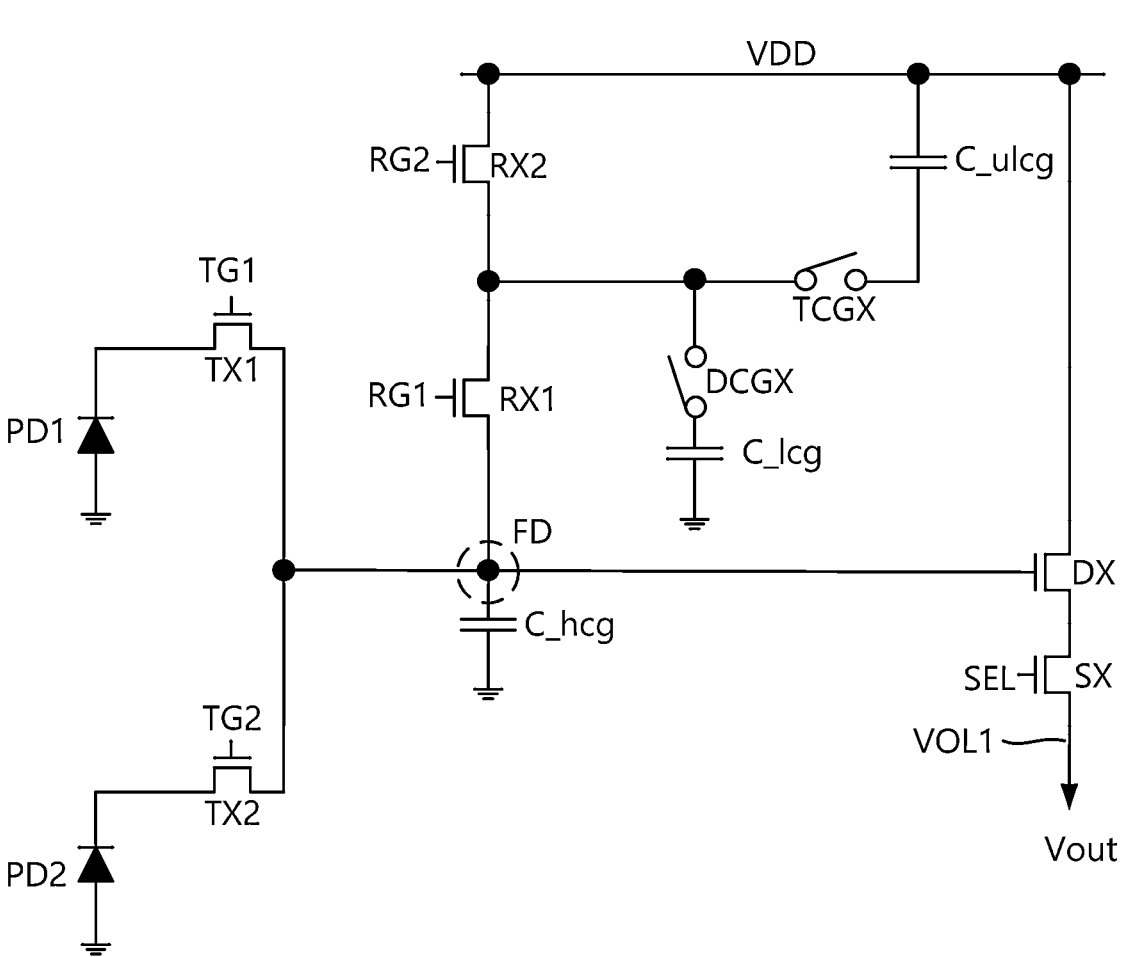
FIGS. 3A to 3D are diagrams illustrating an example in which a floating diffusion region of a third pixel group is expanded depending on a mode.

In some example embodiments, referring to FIG. 3A, an HCG mode may be performed. For example, when the intensity of light is low, the HCG mode may be performed. In this case, both the dual conversion transistor DCGX and the triple conversion transistor TCGX may be turned off, and the floating diffusion region FD may be connected to an HCG capacitor C_hcg. When the first transfer transistor TX1 is turned on, charges generated by the first photoelectric conversion element PD1 may be accumulated in the HCG capacitor C_hcg. As charges are stored in the HCG capacitor C_hcg, the voltage level of the floating diffusion region FD may be decreased.

Figure 3B:
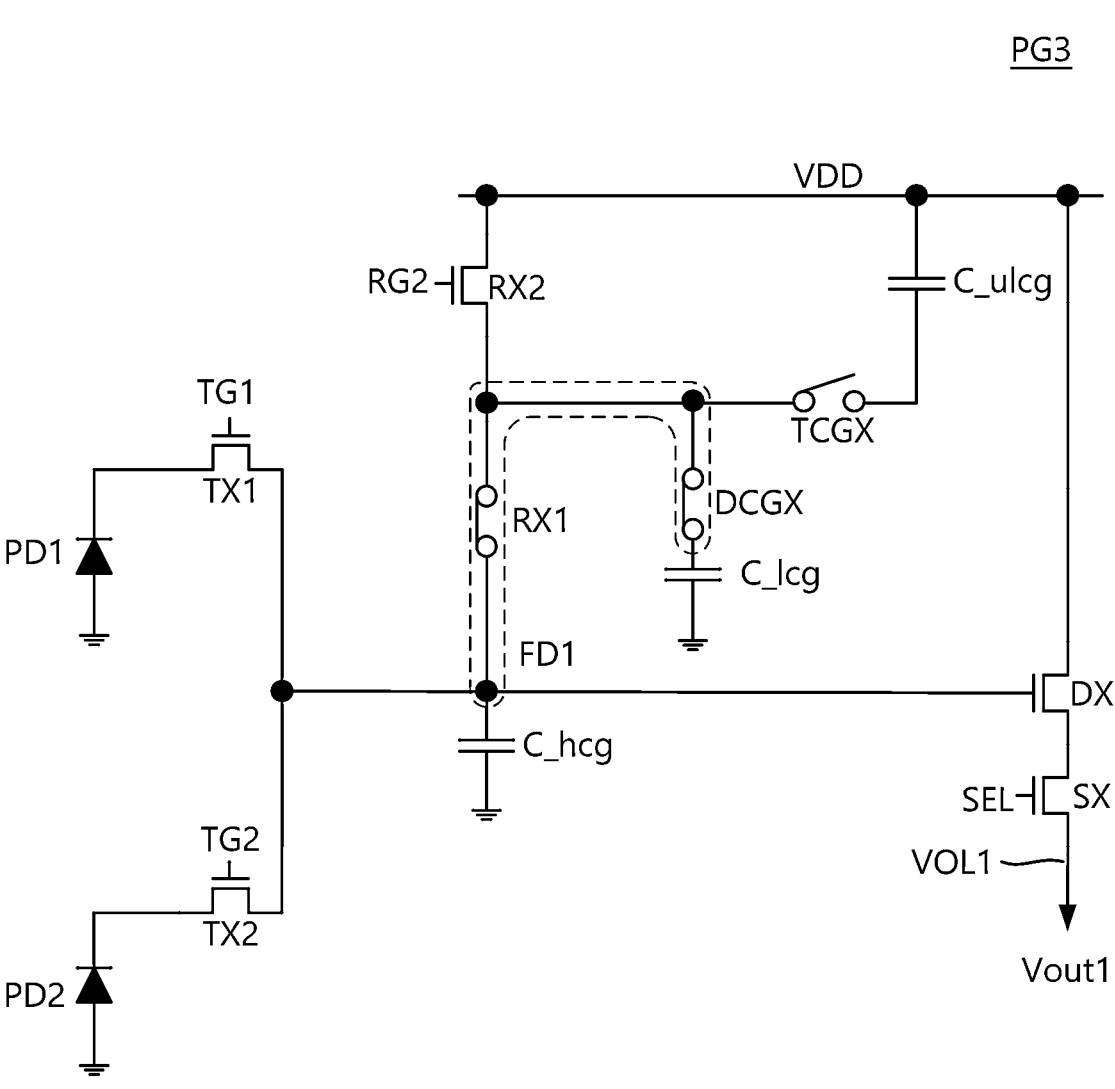

In some example embodiments, referring to FIG. 3B, an LCG mode may be performed. For example, when the intensity of light is high, a capacitance of the HCG capacitor C_hcg on a floating diffusion node may be insufficient to store charges generated by the photoelectric conversion elements PD1 and PD2. In this case, the HCG capacitor C_hcg are more easily saturated, so that image information or phase information to be captured may not be appropriately generated. Therefore, an LCG capacitor C_lcg may be used to prevent or reduce the likelihood of saturation. The LCG capacitor C_lcg may be connected to the floating diffusion region FD through the first reset transistor RX1 and the dual conversion transistor DCGX. For example, a ratio of capacitance of the HCG capacitor C_hcg to capacitance of the LCG capacitor C_lcg may be 1 to 4; however, example embodiments are not limited thereto.

When the first reset transistor RX1 and the dual conversion transistor DCGX are turned on, the floating diffusion region may be expanded to the first floating diffusion region FD1 and the capacitance of the first floating diffusion region FD1 may increase to a sum of the capacitance of the HCG capacitor C_hcg and the capacitance of the LCG capacitor C_lcg. Accordingly, even when the intensity of light is high, charges generated by the photoelectric conversion elements PD1 and PD2 may be more likely to be sufficiently stored.

Figure 3C:
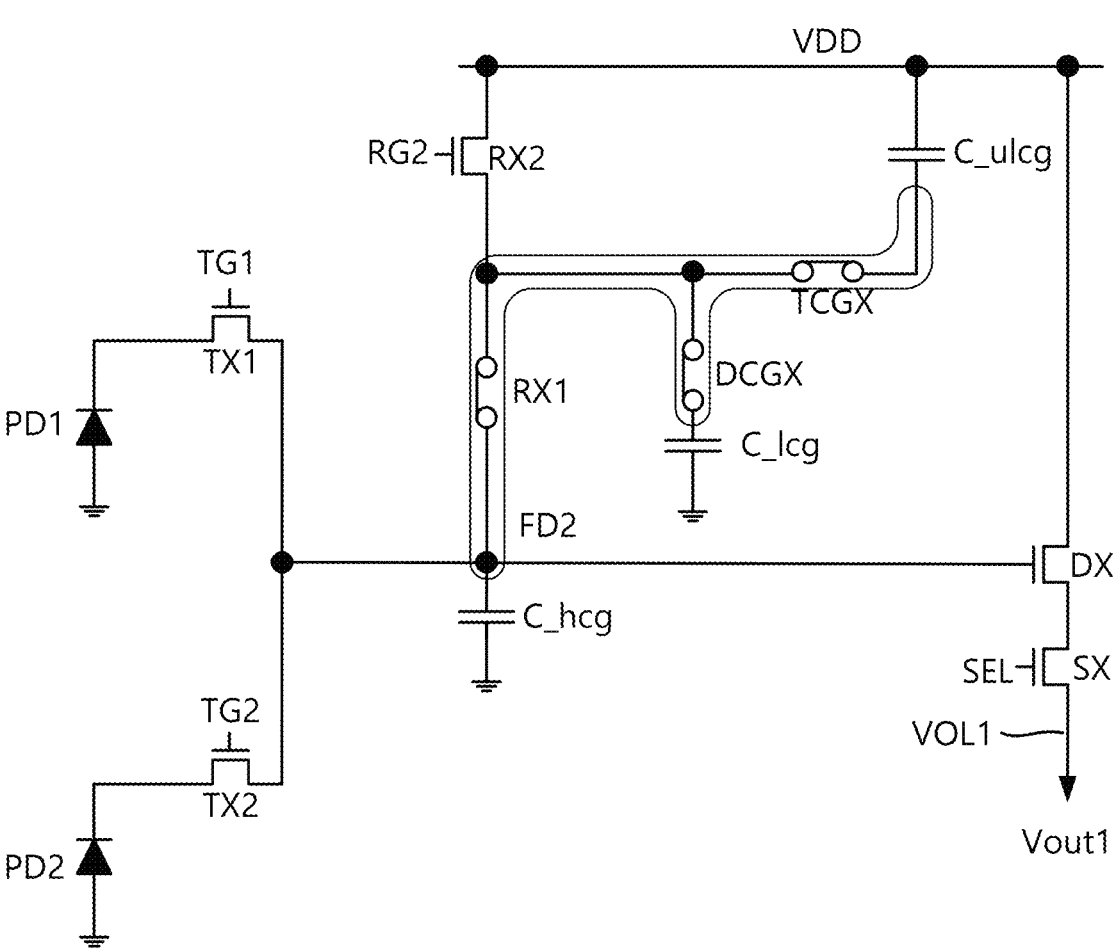

In some example embodiments, referring to FIG. 3C, a ULCG mode may be performed. For example, when the intensity of light is significantly high, capacitances of an HCG capacitor C_hcg and a LCG capacitor C_lcg on a floating diffusion node may be insufficient to store the charges generated by the photoelectric conversion elements PD1 and PD2. Therefore, a ULCG capacitor C_ulcg may be used to prevent or reduce the likelihood and/or amount of saturation. The ULCG capacitor C_ulcg may be connected to a floating diffusion region through a first reset transistor RX1 and a triple conversion transistor TCGX. For example, a ratio of capacitance of the HCG capacitor C_hcg to capacitance of the ULCG capacitor C_ulcg may be 1 to 256; however, example embodiments are not limited thereto.

When the first reset transistor RX1, a dual conversion transistor DCGX, and a triple conversion transistor are turned on, the floating diffusion region may be expanded to a second floating diffusion region FD2 and a capacitance of the second floating diffusion region FD2 may increase to a sum of the capacitance of the HCG capacitor C_hcg, the capacitance of the LCG capacitor C_lcg, and capacitance of the ULCG capacitor C_ulcg. Accordingly, even when the intensity of light is significantly high, charges generated by the photoelectric conversion elements PD1 and PD2 may be more likely to be sufficiently stored.

Figure 3D:
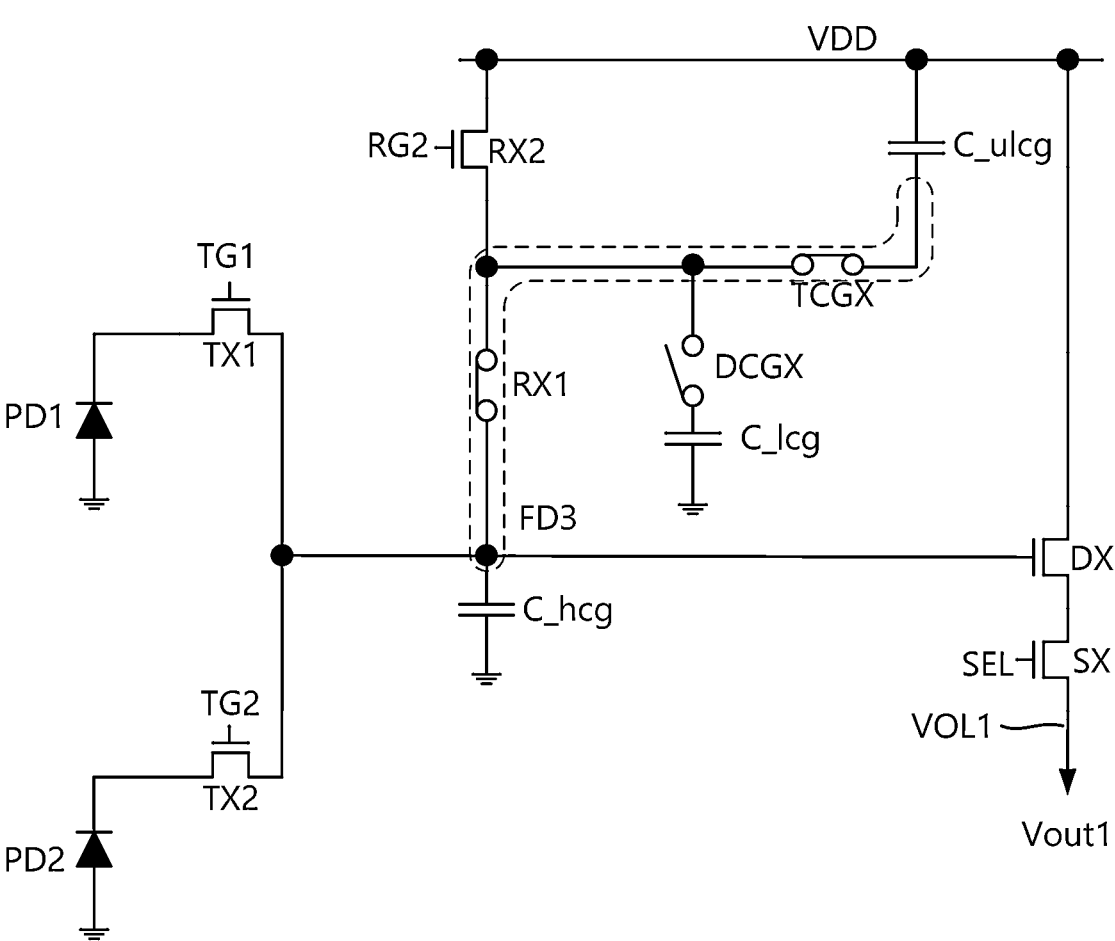

Referring to FIG. 3D, in a ULCG mode, a dual conversion gain transistor DCGX may be turned off and only a triple conversion gain transistor TCGX may be turned on. For example, a floating diffusion region may be expanded to a third floating diffusion region FD3, and capacitance of the third floating diffusion region FD3 may be defined as a sum of the capacitance of an HCG capacitor C_hcg and the capacitance of an ULCG capacitor C_ulcg. In this case, the capacitance of the ULCG capacitor C_ulcg has significantly high capacitance, so that charges generated by photoelectric conversion elements PD1 and PD2 may be or may be more likely to be sufficiently stored even when the intensity of light is significantly high.

Figure 4:
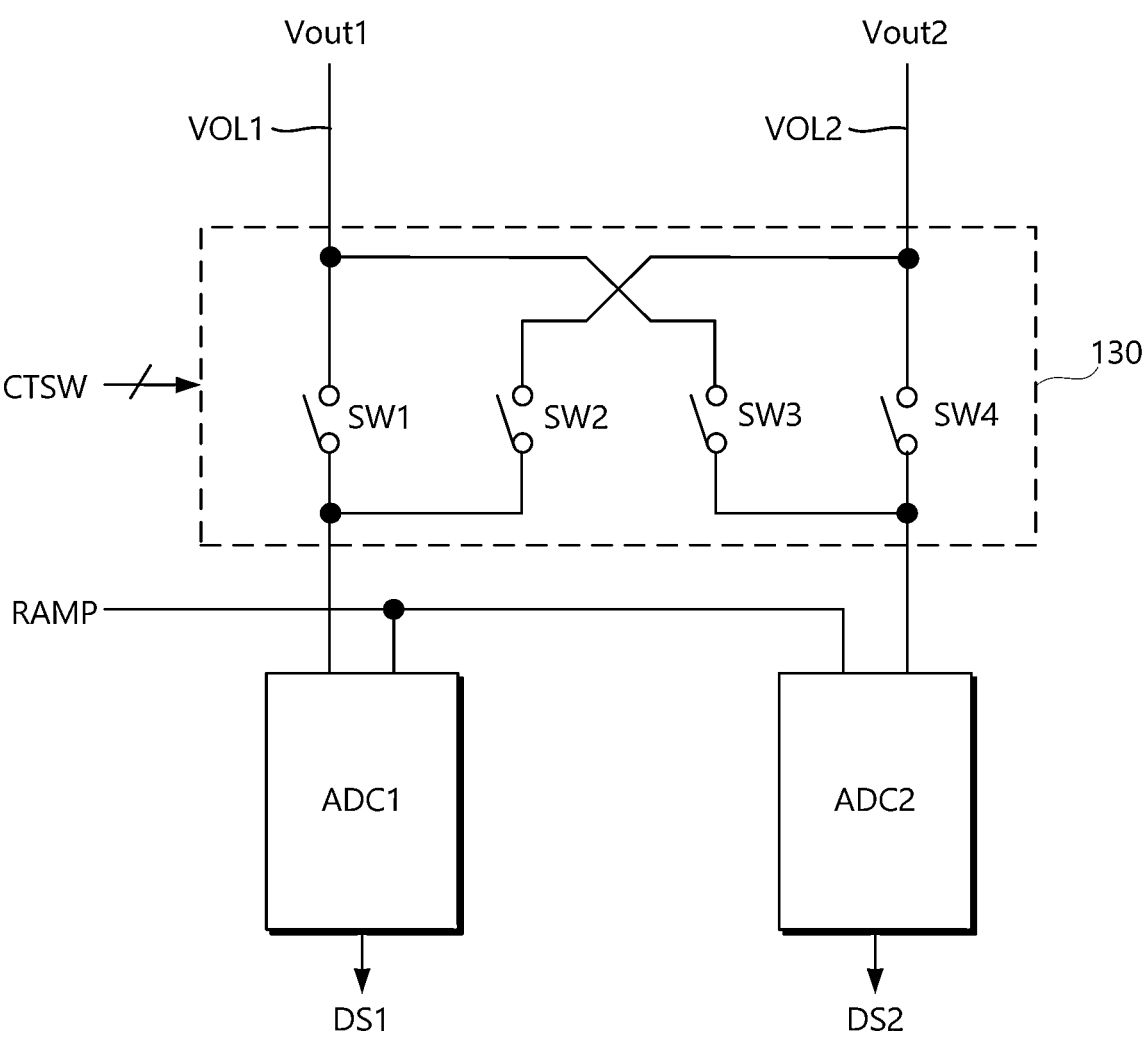
FIG. 4 is a circuit diagram illustrating an example of a switching circuit of FIG. 1.

FIG. 4 is a circuit diagram illustrating an example of the switching circuit 130 of FIG. 1.

Referring to FIG. 4, the switching circuit 130 may include first to fourth switches SW1, SW2, SW3, and SW4. The first to fourth switches SW1, SW2, SW3, and SW4 may be controlled by a switch control signal CTSW. In some example embodiments, each of or at least one of the first to fourth switches SW1, SW1, SW3, and SW4 may be or may include transistors; however, example embodiments are not limited thereto.

The switching circuit 130 may control a path through which a pixel signal, output from a pixel group PG, is transmitted to the ADC block 150.

For example, the first switch SW1 may electrically connect or disconnect a first output line VOL1 and a first analog-to-digital converter ADC1. The second switch SW2 may electrically connect or disconnect a second output line VOL2 and the first analog-to-digital converter ADC1. The third switch SW3 may electrically connect or disconnect the first output line VOL1 and a second analog-to-digital converter ADC2. The fourth switch SW4 may electrically connect or disconnect a second output line VOL2 and the second analog-to-digital converter ADC2.

Accordingly, the first output line VOL1 may be selectively connected to the first analog-to-digital converter ADC1 or the second analog-to-digital converter ADC2. Similarly, the second output line VOL2 may also be selectively connected to the first analog-to-digital converter ADC1 or the second analog-to-digital converter ADC2.

The first analog-to-digital converter ADC1 may process a pixel signal, received through the switching circuit 130, and may output a first digital signal DS1. The second analog-to-digital converter ADC2 may process the pixel signal that is received through the switching circuit 130, and may output a second digital signal DS2.

Figure 5:
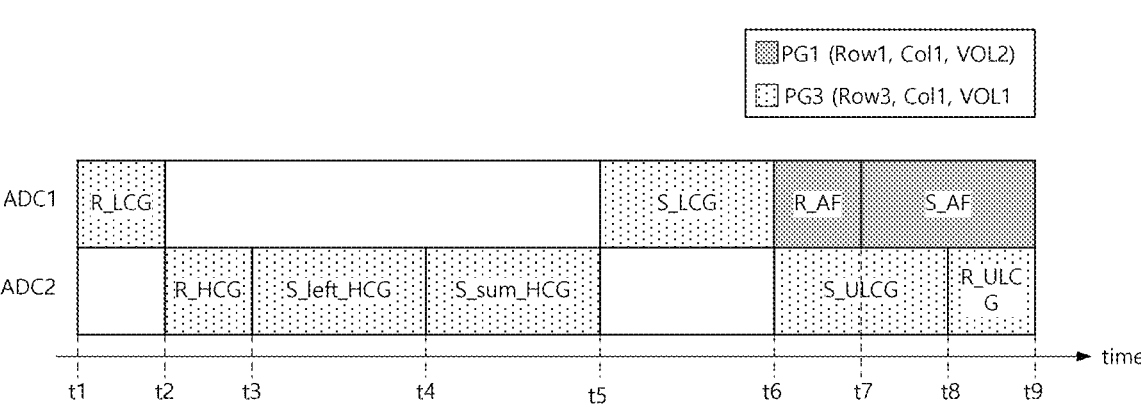
FIG. 5 is a schematic timing diagram illustrating an example in which the image sensor of FIG. 1 performs a triple conversion gain (TCG) operation.

FIG. 5 is a schematic timing diagram illustrating an example in which the image sensor 100 of FIG. 1 performs a TCG operation. Hereinafter, for ease of description, it will be assumed that the TCG operation is performed on the third pixel group PG3. Similarly to the assumption in FIG. 1, it will be assumed that the first pixel group PG1 is disposed in the same first column Col1 as the third pixel group PG3.

Referring to FIG. 5, an LCG reset level R_LCG, an HCG reset level R_HCG, an HCG left signal level S_left_HCG, an HCG sum signal level S_sum_HCG, an LCG signal level S_LCG, a ULCG signal level S_ULCG, and a ULCG reset level R_ULCG may be sequentially sampled on the selected third pixel group PG3. The term "reset level" may refer to a voltage level of a floating diffusion region during a reset operation, and the term "signal level" may refer to a voltage level of the floating diffusion region during a read operation.

The first analog-to-digital converter ADC1 may be connected to the third pixel group PG3 in a first period between t1 and t2 and a second period between t5 and t6, and may process a pixel signal associated with the LCG mode. The first period may be contiguous, the second period may be contiguous, and the second period may not overlap with the first period. The second analog-to-digital converter ADC2 may be connected to the third pixel group PG3 in a third period between t2 and t5, and may process the pixel signal associated with the HCG mode. While operating in the HCG mode and the LCG mode, operations of processing the first analog-to-digital converter ADC1 and the second analog-to-digital converter ADC2 may be performed without overlapping each other.

AF information on the third pixel group PG3 in the HCG mode may be obtained through the HCG left signal level S_left_HCG and the HCG sum signal level S_sum_HCG of the third pixel group PG3.

A more detailed description will be provided with reference FIGS. 3A and 5. In a period between t3 and t4, a pixel signal corresponding to the HCG left signal level S_left_HCG may be output. The HCG left signal level S_left_HCG may correspond to a first photoelectric conversion element PD1 disposed on a first side (or, left side) of the third pixel group PG3. For example, charges generated by the first photoelectric conversion element PD1 disposed on the first side of the third pixel group PG3 may be accumulated in an HCG capacitor C_hcg, resulting in a change in voltage level of a floating diffusion region FD. In this case, the voltage level of the floating diffusion region FD may be the HCG left signal level S_left_HCG, and a pixel signal including first phase information may be output by sampling the HCG left signal level S_left_HCG.

In another period between t4 and t5, a pixel signal corresponding to the HCG sum signal level S_sum_HCG may be output. The HCG sum signal level S_sum_HCG may correspond to first and second photoelectric conversion elements PD1 and PD2, respectively disposed on first and second sides of the third pixel group PG3. For example, charges generated by the second photoelectric conversion element PD2 disposed on the second side of the third pixel group PG3 may be additionally accumulated in the HCG capacitor C_hcg, resulting in a decrease in voltage level of the floating diffusion region FD. The voltage level of the changed floating diffusion region FD may be the HCG sum signal level S_sum_HCG, and a pixel signal including image information may be output by sampling the HCG sum signal level S_sum_HCG.

The HCG right signal level S_right_HCG may correspond to the second photoelectric conversion element PD2 disposed on the second side of the third pixel group PG3. The HCG right signal level (S_right_HCG) may be obtained by subtracting the HCG left signal level S_left_HCG from the HCG sum signal level S_sum_HCG. Accordingly, second phase information corresponding to the second photoelectric conversion element PD2 disposed on the second (e.g. right) side of the third pixel group PG3 may be obtained.

As described above, the AF information in the HCG mode may be obtained using first phase information corresponding to the first photoelectric conversion element PD1 disposed on the first side of the third pixel group PG3 and second phase information corresponding to the second photoelectric conversion element PD2 disposed on the second side of the third pixel group PG3.

In some example embodiments, image information and AF information corresponding to the third pixel group PG3 in the ULCG mode may be obtained. In this case, an operation of obtaining the image information corresponding to the third pixel group PG3 in the ULCG mode may be performed simultaneously with an operation of obtaining phase information corresponding to the third pixel group PG3 in the ULCG mode. In addition, an operation of obtaining the phase information corresponding to the third pixel group PG3 in the ULCG mode may be performed through the first pixel group disposed in the same column PG1 as the third pixel group PG3, rather than the third pixel group PG3. The first pixel group PG1 may be disposed in the same first column Col1 as the selected third pixel group PG3 and may be disposed in a first row Row1, rather than a third row Row3.

As a detailed example, in a period between t6 and t9, the second analog-to-digital converter ADC2 may be connected to the third pixel group PG3. The second analog-to-digital converter ADC2 may process a pixel signal including image information corresponding to the third pixel group PG3 in the ULCG mode. In a period between t6 and t9, the first analog-to-digital converter ADC1 may be connected to the first pixel group PG1 disposed in the same column as the third pixel group PG3. The first analog-to-digital converter ADC1 may process pixel signals associated with the AF reset level R_AF and the AF signal level S_AF of the first pixel group PG1, and thus AF information of the selected third pixel group PG3 in the ULCG mode may be obtained. In this case, as will be described later, the first pixel group PG1 may operate in the HCG mode, and phase information may be obtained using charges generated by a photoelectric conversion element during a short effective integration time (hereinafter referred to as "EIT_s"). The short effective integration time EIT_s may be set within a non-effective integration time (hereinafter referred to as "NIT").

As described above, while the second analog-to-digital converter ADC2 processes a pixel signal including image information in the ULCG mode, the first analog-to-digital converter ADC1 may process a pixel signal including phase information in the ULCG mode, and thus the image sensor 100 according to some example embodiments may effectively obtain AF information. In addition, the AF information may be more effectively obtained using charges generated by a photoelectric conversion element during non-effective integration time NIT of the first pixel group PG1.

Figure 6:
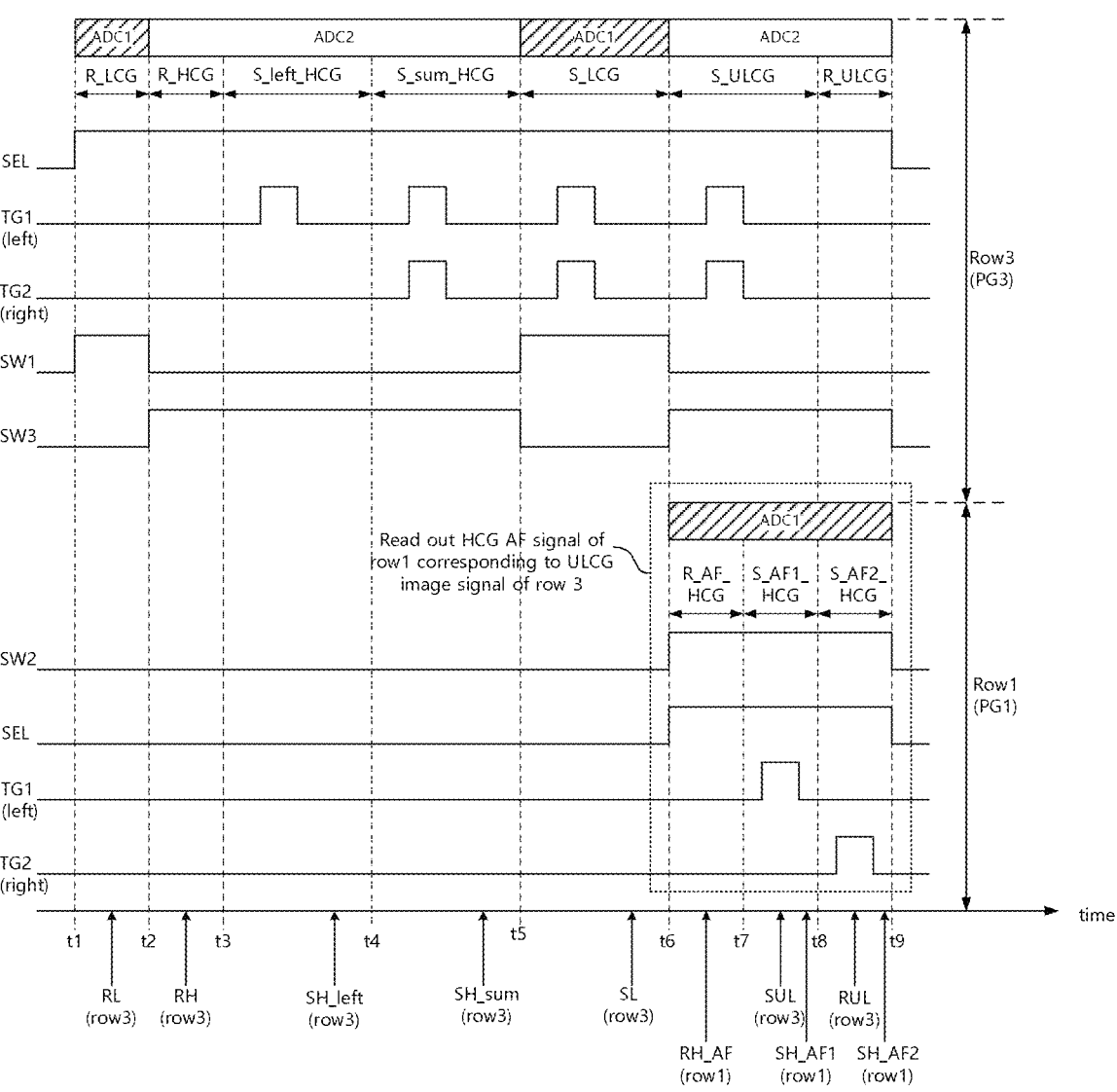
FIG. 6 is a timing diagram illustrating an example of a TCG operation of the image sensor of FIG. 1.
Figure 7A:
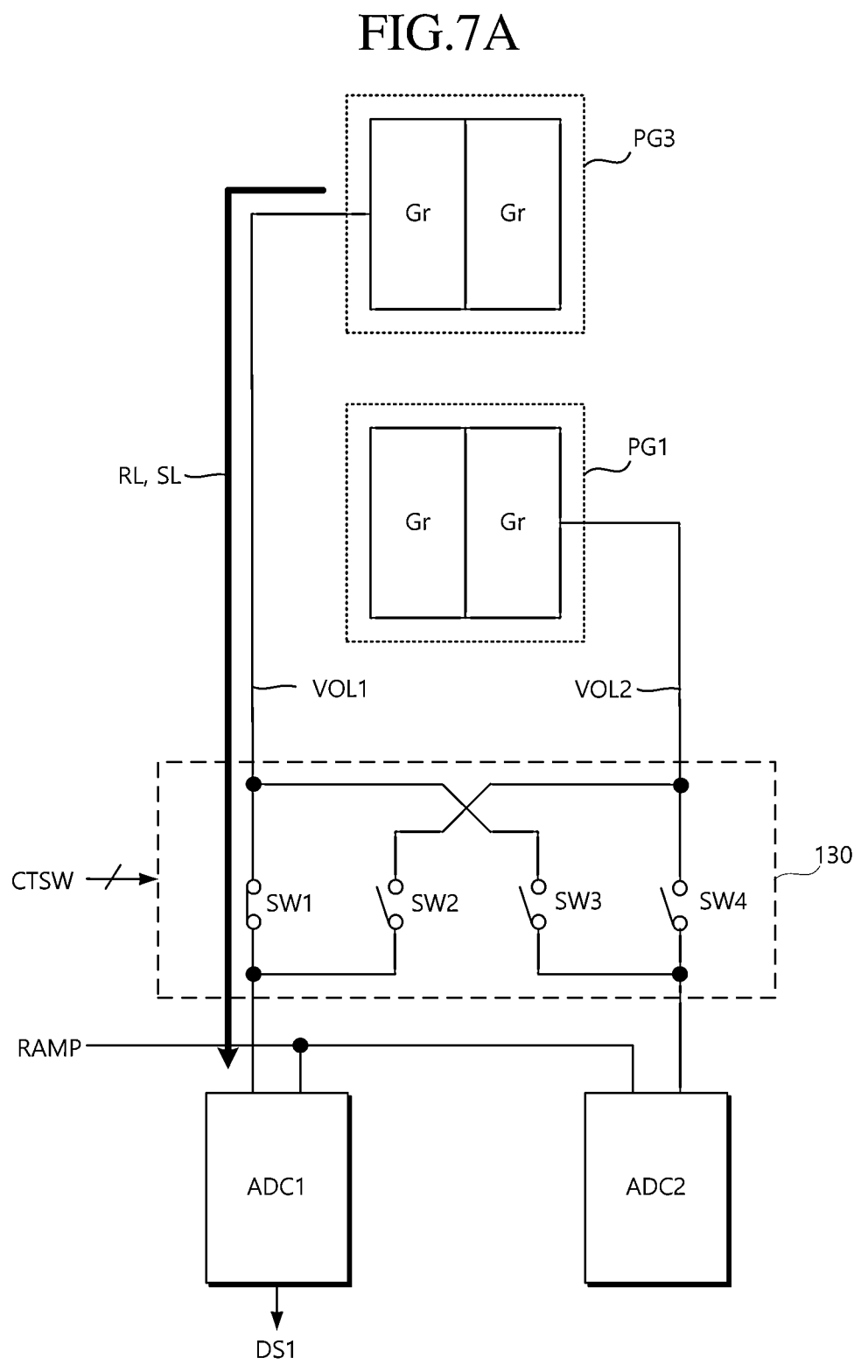
Figure 7B:
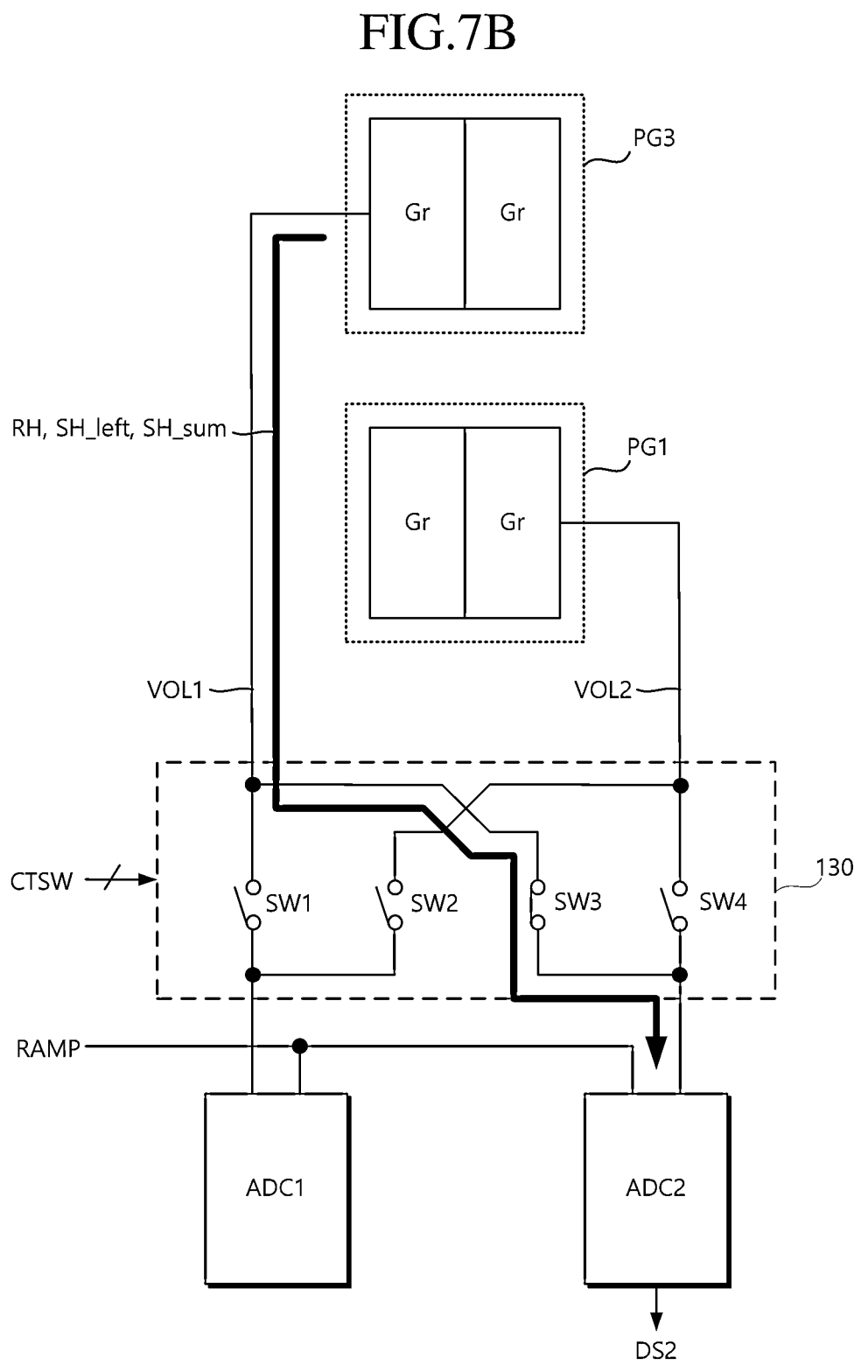
Figure 7C:
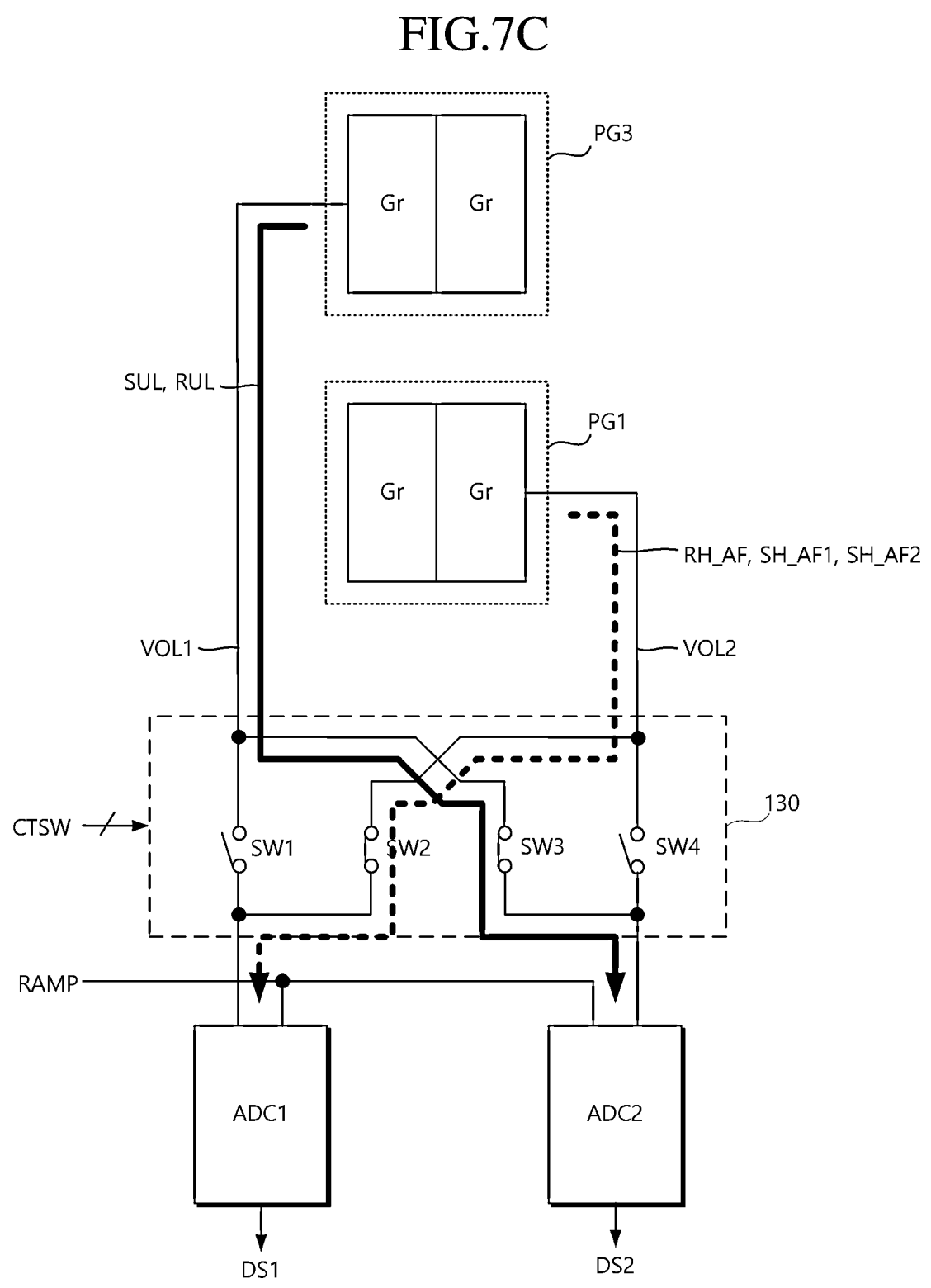
Figure 8:
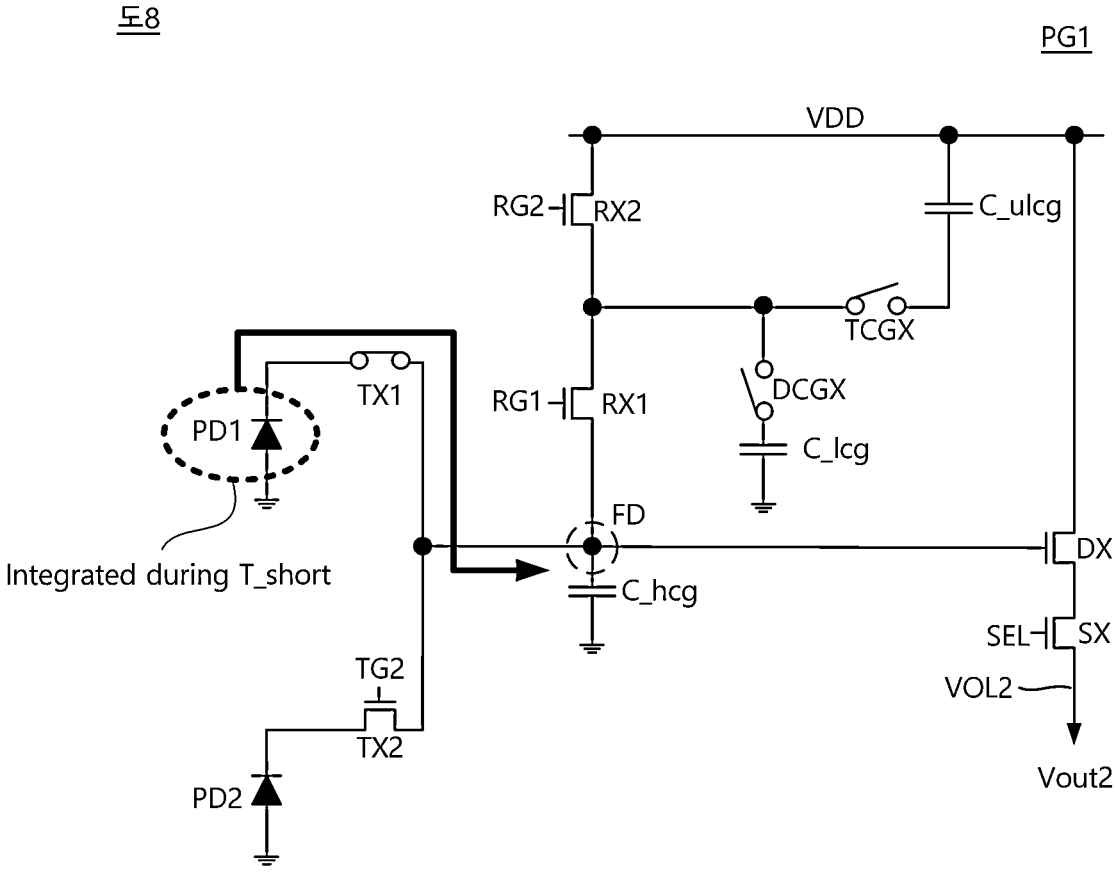
FIG. 8 is a diagram illustrating an example of a first pixel group operating in a high conversion gain (HCG) mode to obtain phase information.

FIGS. 6 to 8 are diagrams provided to describe the TCG operation of the image sensor 100 of FIG. 1 in more detail. For example, FIG. 6 is a timing diagram illustrating an example of the TCG operation of the image sensor 100 of FIG. 1. FIGS. 7A to 7C are diagrams illustrating examples of a state of connection between pixel groups and analog-to-digital converters when a TCG operation is performed. FIG. 8 is a diagram illustrating an example of a first pixel group PG1 operating in an HCG mode to obtain phase information. For ease of description, similarly to the assumption in FIG. 1, it will be assumed that the TCG operation is performed on the third pixel group PG3. In addition, similarly to the assumption in FIG. 1, it will be assumed that the first pixel group PG1 is disposed in the same first column Col1 as the third pixel group PG3.

Referring to FIG. 6, in a period between t1 and t2, the LCG reset level R_LCG may be sampled, and the first analog-to-digital converter ADC1 may convert a pixel signal RL corresponding to the LCG reset level R_LCG into a digital signal and may output the converted digital signal.

As a detailed example, in the period between t1 to t2, the first switch SW1 may be turned on, as illustrated in FIG. 6. Accordingly, the third pixel group PG3 may be connected to the first analog-to-digital converter ADC1, as illustrated in FIG. 7A. In addition, the dual conversion transistor DCGX of the third pixel group PG3 may be turned on, as illustrated in FIG. 3B, and thus the floating diffusion region may be expanded to the first floating diffusion region FD1. Accordingly, a capacitance of the first floating diffusion region FD1 may be provided as a sum of capacitance of the HCG capacitor C_hcg and capacitance of the LCG capacitor C_lcg. Then, the first floating diffusion region FD1 may be reset to a power supply voltage VDD, and a sampling operation may be performed on an LCG reset level R_LCG. A pixel signal RL corresponding to the LCG reset level R_LCG may be provided to the first analog-to-digital converter ADC1, and the first analog-to-digital converter ADC1 may convert the received pixel signal RL into a digital signal and may output the converted digital signal.

In a period between t2 and t3, an HCG reset level R_HCG may be sampled, and the second analog-to-digital converter ADC2 may convert a pixel signal RH corresponding to the HCG reset level R_HCG into a digital signal and may output the converted digital signal.

As a detailed example, in a period between t2 and t3, the first switch SW1 may be turned off and the third switch SW3 may be turned on, as illustrated in FIG. 6. Accordingly, the third pixel group PG3 may be connected to the second analog-to-digital converter ADC2, as illustrated in FIG. 7B. In addition, the dual conversion transistor DCGX and the triple conversion transistor TCGX of the third pixel group PG3 may be turned off, as illustrated in FIG. 3A. Accordingly, a capacitance of the floating diffusion region FD may be provided as capacitance of the HCG capacitor C_hcg. Then, the floating diffusion region FD may be reset to a power supply voltage VDD, and a sampling operation may be performed on the HCG reset level R_HCG. In this case, as illustrated in FIG. 7B, a pixel signal RH corresponding to the HCG reset level R_HCG may be provided to the second analog-to-digital converter ADC2, and the second analog-to-digital converter ADC2 may convert the received pixel signal RH into a digital signal and may output the converted digital signal.

In a period between t3 and t4, the HCG left signal level S_left_HCG may be sampled, and the second analog-to-digital converter ADC2 may convert a pixel signal SH_left corresponding to the HCG left signal level S_left_HCG into a digital signal and may output the converted digital signal. Accordingly, first phase information of the third pixel group PG3 in the HCG mode may be obtained.

As a detailed example, in a period between t3 and t4, the first transfer transistor TG1 connected to the first photoelectric conversion element PD1 disposed on the first side of the third pixel group PG3 may be turned on, as illustrated in FIG. 6. Accordingly, charges generated by the first photoelectric conversion element PD1 disposed on the first side of the third pixel group PG3 may be accumulated in the HCG capacitor C_hcg, as illustrated in FIG. 3A. In this case, a voltage level of the floating diffusion region FD may be the HCG left signal level S_left_HCG, and a sampling operation may be performed on the HCG left signal level S_left_HCG. In addition, as illustrated in FIG. 7B, the pixel signal SH_left corresponding to the HCG left signal level S_left_HCG may be provided to the second analog-to-digital converter ADC2, and the second analog-to-digital converter ADC2 may convert the pixel signal SH_left into a digital signal and may output the converted digital signal. Accordingly, first phase information in the HCG mode may be obtained.

In a period between t4 and t5, as illustrated in FIG. 6, an HCG sum signal level S_sum_HCG may be sampled, and the second analog-to-digital converter ADC2 may convert a pixel signal SH_sum corresponding to the HCG sum signal level S_sum_HCG into a digital signal and may output the converted digital signal. Accordingly, image information and second phase information in the HCG mode may be obtained.

As a detailed example, referring to FIG. 6, in a period between t4 and t5, the first transfer transistor TG1 connected to the first photoelectric conversion element PD1 disposed on a first side (e.g., a left side) of the third pixel group PG3 and the second transfer transistor TG2 connected to the second photoelectric conversion element PD2 disposed on a second side (e.g., a right side) of the third pixel group PG3 may be turned on. Charges generated by the first and second photoelectric conversion elements PD1 and PD2 may be accumulated in the HCG capacitor C_hcg.

In this case, as illustrated in FIG. 7B, a voltage level of the floating diffusion region FD may be the HCG sum signal level S_sum_HCG, and a sampling operation may be performed on the HCG sum signal level S_sum_HCG. The pixel signal SH_sum corresponding to the HCG sum signal level S_sum_HCG may be provided to the second analog-to-digital converter ADC2, and the second analog-to-digital converter ADC2 may convert the received pixel signal SH into a digital signal and may output the converted digital signal. Then, image information in the HCG mode may be obtained based on the digital signals corresponding to the HCG reset level R_HCG and the HCG sum signal level S_sum_HCG.

In addition, an HCG right signal level S_right_HCG may be obtained by subtracting the HCG left signal level S_left_HCG from the HCG sum signal level S_sum_HCG. Alternatively, a digital signal corresponding to the HCG right signal level S_right_HCG may be obtained by subtracting the digital signal corresponding to the HCG left signal level S_left_HCG from the digital signal corresponding to the HCG sum signal level S_sum_HCG. Thus, second phase information in the HCG mode may be obtained. Then, AF information in the HCG mode may be obtained using a difference between the first phase information and the second phase information in the HCG mode.

In a period between t5 and t6, an LCG signal level S_LCG may be sampled, and the first analog-to-digital converter ADC1 may convert a pixel signal SL corresponding to the LCG signal level S_LCG into a digital signal and may outputs the converted digital signal. Accordingly, image information in the LCG mode may be obtained.

As a detailed example, in the period between t5 and t6, the dual conversion transistor DCGX of the third pixel group PG3 may be turned on, as illustrated in FIG. 6. Accordingly, capacitance of the first floating diffusion region FD1 may be provided as a sum of capacitance of the HCG capacitor C_hcg and capacitance of the LCG capacitor C_lcg, as illustrated in FIG. 3B. In addition, the first transfer transistor TX1 and the second transfer transistor TX2 may be turned on, and thus charges generated by the first and second photoelectric conversion elements PD1 and PD2 may be accumulated in the HCG capacitor C_hcg and the LCG capacitor C_lcg. In this case, a voltage level of the first floating diffusion region FD1 may be the LCG signal level S_LCG, and a sampling operation may be performed on the LCG signal level S_LCG. The pixel signal SL corresponding to the LCG signal level S_LCG may be provided to the first analog-to-digital converter ADC1, and the first analog-to-digital converter ADC1 may convert the received pixel signal SL into a digital signal and may output the converted digital signal. Then, image information in the LCG mode may be obtained based on the digital signals corresponding to the LCG reset level R_LCG and the LCG signal level S_LCG.

In a period between t6 and t8, a ULCG signal level S_ULCG may be sampled, and the second analog-to-digital converter ADC2 may convert a pixel signal SUL corresponding to the ULCG signal level S_ULCG into a digital signal and may output the converted digital signal.

As a detailed example, in the period between t6 to t8, both the dual conversion transistor DCGX and the triple conversion transistor TCGX of the third pixel group PG3 may be turned on, as illustrated in FIGS. 3C and 6. Accordingly, a capacitance of the second floating diffusion region FD2 may be provided as a sum of capacitance of the HCG capacitor C_hcg, capacitance of the LCG capacitor C_lcg, and capacitance of the ULCG capacitor C_ulcg. In addition, the first transfer transistor TX1 and the second transfer transistor TX2 are turned on. Accordingly, charges generated by the first and second photoelectric conversion elements PD1 and PD2 may be accumulated in the HCG capacitor C_hcg, the LCG capacitor C_lcg, and ULCG capacitor C_ulcg. In this case, a voltage level of the second floating diffusion region FD2 may be the ULCG signal level S_ULCG, and a sampling operation may be performed on the ULCG signal level S_ULCG. In addition, the third switch SW3 may be turned on, as illustrated in FIG. 6. Accordingly, as illustrated in FIG. 7C, a pixel signal SUL corresponding to the ULCG signal level S_ULCG may be provided to the second analog-to-digital converter ADC2, and the second analog-to-digital converter ADC2 may convert the received pixel signal SUL into a digital signal and may output the converted digital signal.

In a period between t8 and t9, a ULCG reset level R_ULCG may be sampled, and the second analog-to-digital converter ADC2 may convert a pixel signal RUL corresponding to the ULCG reset level R_ULCG into a digital signal and may output the converted digital signal. Accordingly, image information corresponding to the ULCG mode may be obtained.

As a detailed example, in a period between t8 and t9, the second reset transistor RX2 may be turned on and the second floating diffusion region FD2 may be reset to a power supply voltage VDD, as illustrated in FIGS. 3C and 6. In this case, a voltage level of the second floating diffusion region FD2 may be the ULCG reset level R_ULCG, and a sampling operation may be performed on the ULCG reset level R_ULCG. In addition, as illustrated in FIG. 7C, a pixel signal RUL corresponding to the ULCG reset level R_ULCG may be provided to the second analog-to-digital converter ADC2, and the second analog-to-digital converter ADC2 may convert the received pixel signal RUL into a digital signal and may output the converted digital signal. Then, image information in the ULCG mode may be obtained based on the digital signals corresponding to the ULCG reset level R_ULCG and the ULCG signal level S_ULCG.

As described above, in the period between t6 and t9, image information of the third pixel group PG3 in the ULCG mode may be obtained using the second analog-to-digital converter ADC2.

Continuing to refer to FIG. 6, in the period between t6 and t9, phase information of the selected third pixel group PG3 in the ULCG mode may be obtained using the first analog-to-digital converter ADC1. For example, in the period between t6 and t9, image information of the third pixel group PG3 in the ULCG mode may be obtained using the second analog-to-digital converter ADC2, and phase information of the third pixel group PG3 in the ULCG mode may be obtained using the first analog-to-digital converter ADC1.

In this case, phase information of the third pixel group PG3 in the ULCG mode may be obtained through the first pixel group PG1 disposed in the same column as the third pixel group PG3. The first pixel group PG1 may use charges, generated during a short effective integration time EIT_s, to obtain the phase information in the ULCG mode. The charges, generated during the short effective integration time EIT_s, may be accumulated in the HCG capacitor C_hcg. For example, the first pixel group PG1 may operate in the HCG mode. The short effective integration time EIT_s may be set within, for example, a non-effective integration time NIT.

For example, in a period between t6 and t7, the second switch SW2 may be turned on, as illustrated in FIG. 6. Accordingly, the first pixel group PG1 may be connected to the first analog-to-digital converter ADC1, as illustrated in FIG. 7C. In addition, as illustrated in FIG. 7C, both the dual conversion gain transistor DCGX and the triple conversion gain transistor TCGX of the first pixel group PG1 may be turned off, and a capacitance of the floating diffusion region FD may be provided as capacitance of the HCG capacitor C_hcg. Then, the floating diffusion region may be reset to the power supply voltage VDD, and a sampling operation may be performed on the HCG AF reset level R_AF_HCG. As illustrated in FIG. 7C, a pixel signal RH_AF corresponding to the HCG AF reset level R_HCG_AF may be provided to the first analog-to-digital converter ADC1, and the first analog-to-digital converter ADC1 may convert the received pixel signal RH_AF into a digital signal and may output the converted digital signal.

In a period between t7 and t8, the first transfer transistor TX1 connected to the first photoelectric conversion element PD1 disposed on the first side of the first pixel group PG1 may be turned on, as illustrated in FIGS. 6 and 8. Accordingly, charges generated by the first photoelectric conversion element PD1 disposed on the first side of the first pixel group PG1 may be accumulated in the HCG capacitor C_hcg. The charges generated by the first photoelectric conversion element PD1 may be charge generated during the short effective integration time EIT_s. In this case, a voltage level of the floating diffusion region may be defined as a first HCG AF signal level S_AF1_HCG. Then, the first HCG AF signal level S_AF1_HCG may be sampled. As illustrated in FIG. 7C, the first analog-to-digital converter ADC1 may convert a pixel signal SH_AF1 corresponding to the first HCG AF signal level S_AF1_HCG into a digital signal and may output the converted digital signal. Accordingly, first phase information in the HCG mode may be obtained.

In the period between t8 and t9, the second transfer transistor TX2 connected to the second photoelectric conversion element PD2 disposed on the second side of the first pixel group PG1 may be turned on, as illustrated in FIGS. 6 and 8. Accordingly, charges generated by the second photoelectric conversion element PD2 disposed on the second side of the first pixel group PG1 may be accumulated in the HCG capacitor C_hcg. The charges generated by the second photoelectric conversion element PD2 may be charges generated during the short effective integration time EIT_s. In this case, a voltage level of the floating diffusion region may be defined as a second HCG AF signal level S_AF2_HCG. Then, the second HCG AF signal level S_AF2_HCG may be sampled. As illustrated in FIG. 7C, the first analog-to-digital converter ADC1 may convert a pixel signal SH_AF2 corresponding to the second HCG AF signal level S_AF2_HCG into a digital signal and may output the converted digital signal. Accordingly, second phase information in the HCG mode can be obtained. Then, AF information of the first pixel group PG1 in the HCG mode may be obtained based on the digital signals corresponding to the HCG AF reset level R_HCG_AF and the first and second HCG AF signal levels S_AF1_HCG and S_AF2_HCG. The AF information of the first pixel group PG1 in the HCG mode may correspond to the AF information of the third pixel group PG3, disposed in the same column, in the ULCG mode.

As described above, according to some example embodiments, image information of the third pixel group PG3 selected in the ULCG mode may be obtained using the second analog-to-digital converter ADC2 connected to the third pixel group PG3, and phase information of the third pixel group PG3 in the ULCG mode may be obtained using the first analog-to-digital converter ADC1 connected to the first pixel group PG1 arranged in the same column. In this case, the first pixel group PG1 may output a pixel signal, including the phase information, using charges generated during the short effective integration time EIT_s. A time length of the short effective integration time EIT_s may be set in consideration of a ratio of a conversion gain of the ULCG capacitor C_ulcg to a conversion gain of the HCG capacitor C_hcg. A ratio of the time length of the long effective integration time (hereinafter referred to as "EIT_1") to the time length of the short effective integration time EIT_s will be described in more detail with reference to FIGS. 9 to 11.

Figure 9:
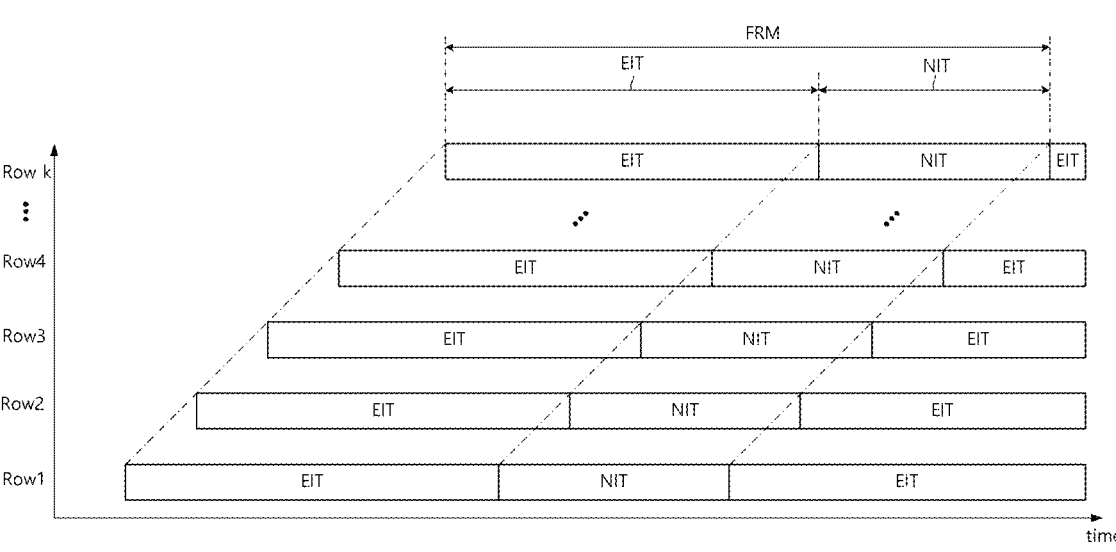
FIG. 9 is a diagram illustrating an example of an operation of an image sensor according to the related art, based on a rolling shutter method.
Figure 10:
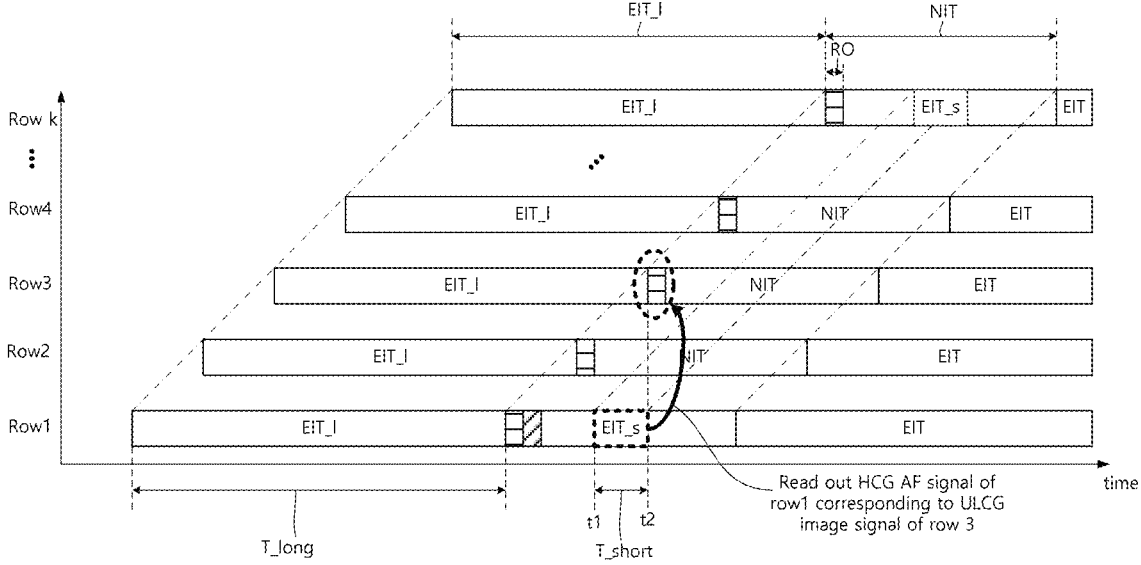
FIG. 10 is a diagram illustrating an example of an operation of the image sensor of FIG. 1 according to some example embodiments, based on a rolling shutter method.

FIG. 9 is a diagram illustrating an example of an operation of an image sensor according to the related art, based on a rolling shutter method. FIG. 10 is a diagram illustrating an example of an operation of the image sensor 100 of FIG. 1 according to some example embodiments, based on a rolling shutter method. FIG. 11 is a diagram illustrating an example of a time length of a short effective integration time EIT_s compared with a long effective integration time EIT_1.

Referring to FIG. 9, in the case of an image sensor according to the related art, a plurality of rows Row1 to Row4 may be sequentially selected by a rolling shutter method. A single frame time FRM may roughly include an effective integration time EIT and a non-effective integration time NIT. The effective integration time EIT may refer to a time during which charges are substantially generated by a photoelectric conversion element, and the charges generated during the effective integration time EIT may be used to output a pixel signal including image information and/or phase information. The non-effective integration time NIT may refer to a time during which no charge is substantially generated in the photoelectric conversion element, and the charge generated during the non-effective integration time NIT may not be used to output a pixel signal including image information and/or phase information.

Referring to FIG. 10, unlike the image sensor according to the related art, a single frame time FRM of the image sensor 100 according to some example embodiments may include a long effective integration time EIT_1 and a short effective integration time EIT_s. The short effective integration time EIT_s may be set within a non-effective integration time NIT. Charges generated by photoelectric conversion elements of a pixel group during the short effective integration time EIT_s may be used to obtain phase information of another pixel group disposed in another row and the same column. Charges generated by photoelectric conversion elements of a pixel group during the long effective integration time EIT_1 may be used to obtain image information and/or phase information of the pixel group.

As a detailed example, at a point in time t2, a readout operation RO may be performed to obtain image information in a ULCG mode for a selected third pixel group PG3. In this case, charges generated by the photoelectric conversion elements of the third pixel group PG3 during the long effective integration time EIT_1 may be transferred to the ULCG capacitor C_ulcg, and a read operation may be performed on the charges.

A first pixel group PG1 disposed in a column, the same as a column of the selected third pixel group PG3, and a row, different from a row of the selected third pixel group PG3, may be a non-effective integration time NIT at a point in time t2. A third pixel group PG3 and a first pixel group PG1 are disposed in the same column and are adjacent to each other in a row direction, so that phase information obtained through the third pixel group PG3 may be substantially the same as phase information obtained through the first pixel group PG1.

In some example embodiments, the short effective integration time EIT_s may be set within the non-effective integration time NIT of the first pixel group PG1. For example, the short effective integration time EIT_s may be set to a time between t1 and t2. Charges generated by the photoelectric conversion element of the first pixel group PG1 during the short effective integration time EIT_s may be used to obtain phase information of the selected third pixel group PG3. In this case, a time length T_short of the short effective integration time EIT_s may be set in consideration of conversion gains of the ULCG capacitor C_ulcg and the HCG capacitor C_hcg.

A more detailed description will be provided with reference to FIGS. 10 and 11. The short effective integration time EIT_s is set within the non-effective integration time NIT, so that the time length T_short of the short effective integration time EIT_s should be set to be smaller than a time length T_long of the long effective integration time EIT_1. When the first pixel group PG1 using the short effective integration time EIT_s operates in an HCG mode, a ratio of the time length T_short of the short effective integration time EIT_s to a time length T_long of the long effective integration time EIT_1 may be equal to or similar to a ratio of the conversion gain of the ULCG capacitor C_ulcg to the conversion gain of the HCG capacitor C_hcg.

For example, as illustrated in FIG. 11, it will be assumed that the ratio of the conversion gain of the HCG capacitor C_hcg to the conversion gain of the ULCG capacitor C_ulcg is 256 to 1. In this case, the ratio of the time length T_long of the long effective integration time EIT_1 to the time length T_short of the short effective integration time EIT_s may be 256 to 1 or a ratio similar thereto. For example, in FIG. 11, "a" may be 10 or a value similar thereto. In this case, the time length T_short of the short effective integration time EIT_s is sufficiently small, so that the HCG capacitor C_hcg of the first pixel group PG1 may output a pixel signal including phase information without being saturated.

As described above, the image sensor 100 according to some example embodiments may be implemented such that at least two analog-to-digital converters correspond to a single pixel group. While one analog-to-digital converter is connected to a selected pixel group to process a pixel signal, another analog-to-digital converter may be connected to another pixel group to process a pixel signal. In this case, the selected pixel group and the other pixel group may be disposed in the same column but in different rows, and the pixel signal processed by the another analog-to-digital converter may include phase information on the selected pixel group. As a result, the image sensor 100 according to some example embodiments may effectively obtain AF information on the selected pixel group.

The above description is merely by way of example, and example embodiments are not limited thereto. Example embodiments may be modified and applied in various ways. For example, in FIG. 6, it has been described that the first pixel group PG1 obtains phase information through "R, S_left, S_right." However, this is merely by way of example and example embodiments are not limited thereto. For example, the first pixel group PG1 may obtain phase information through various operation modes such as "R, S_left, S_sum," "S_left, R," and "S_left, R/S_right, R." In addition, example embodiments may be modified and applied in various ways. Hereinafter, various modified examples and application examples will be described in more detail.

FIG. 12 is a schematic timing diagram illustrating another example in which the image sensor 100 of FIG. 1 performs a TCG operation. For ease of description, similarly to the assumptions in FIGS. 5 to 11, it will be assumed that the TCG operation is performed on a third pixel group PG3 and a first pixel group PG1 is disposed in the same column as the third pixel group PG3.

In FIG. 5, it has been described that the first analog-to-digital converter ADC1 processes the pixel signal associated with the LCG mode, and the second analog-to-digital converter ADC2 processes the pixel signal associated with the HCG mode. However, this is merely by way of example, and the first and second analog-to-digital converters ADC1 and ADC2 may be connected to the pixel group in various manners to process pixel signals.

For example, as illustrated in FIG. 12, a second analog-to-digital converter ADC2 may process both a pixel signal associated with an LCG mode and a pixel signal associated with an HCG mode. However, this is merely by way of example, and a first analog-to-digital converter ADC1 may process both the pixel signal associated with the LCG mode and the pixel signal associated with the HCG mode.

FIG. 13 is a schematic timing diagram illustrating another example in which the image sensor 100 of FIG. 1 performs a TCG operation. For ease of description, similarly to the assumptions of FIGS. 5 to 12, it will be assumed that the TCG operation is performed on a third pixel group PG3 and a first pixel group PG1 is disposed in the same column as the third pixel group PG3.

In FIGS. 5 and 12, it has been described that in a period between t6 and t9, the operation of obtaining the phase information corresponding to the third pixel group PG3 in the ULCG mode through the first analog-to-digital converter ADC1 is performed simultaneously with the operation of obtaining the image information corresponding to the third pixel group PG3 in the ULCG mode. However, this is merely by way of example, and the operation of obtaining the phase information corresponding to the third pixel group PG3 in the ULCG mode through the first analog-to-digital converter ADC1 may be performed in another period.

For example, as illustrated in FIG. 13, an operation of obtaining phase information corresponding to the third pixel group PG3 in the ULCG mode through the first analog-to-digital converter ADC1 is performed in a period between t2 and t4. However, this is merely by way of example, and the operation of obtaining the phase information corresponding to the third pixel group PG3 in the ULCG mode through the first analog-to-digital converter ADC1 may be performed in various periods within a readout time (t1 to t9).

Figures 14, 15:
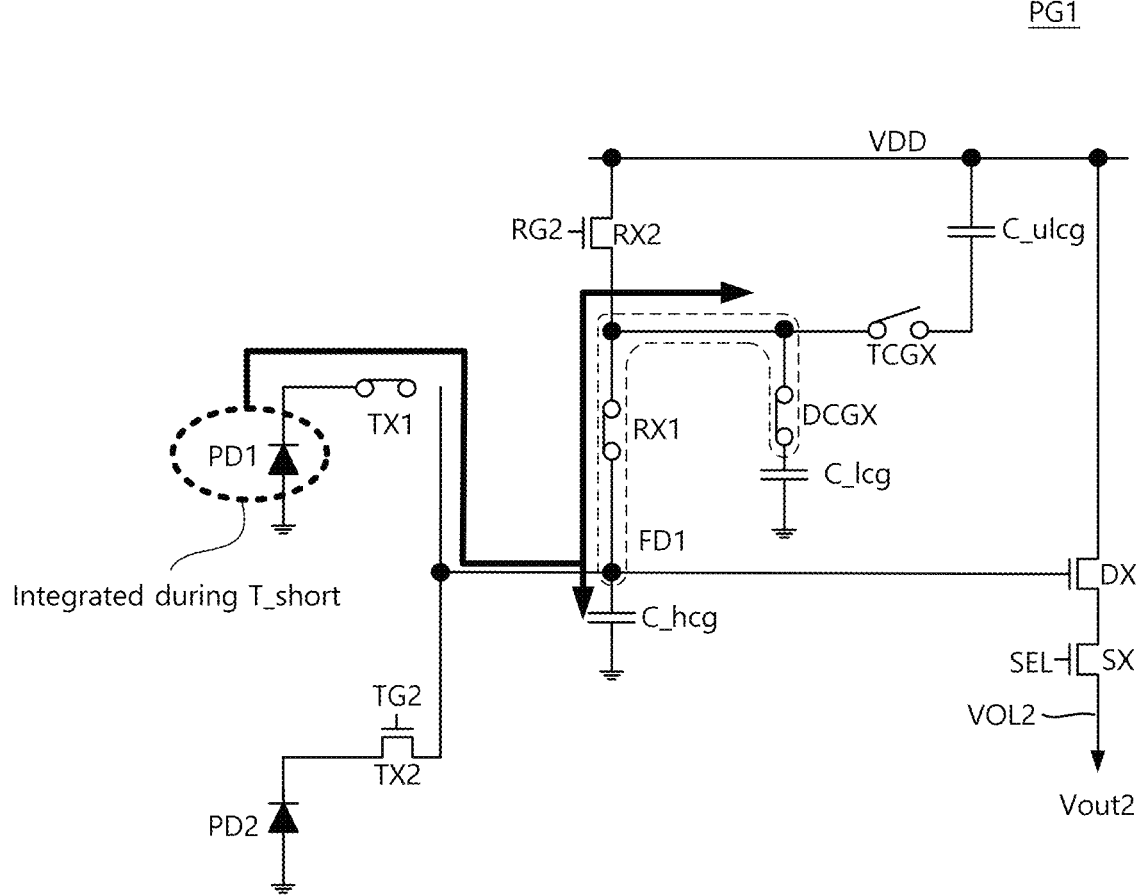
FIG. 14 is a diagram illustrating an example of a first pixel group operating in an LCG mode to obtain phase information.
FIG. 15 is a diagram illustrating an example of a time length of a short effective integration time compared with a long effective integration time.

FIG. 14 is a diagram illustrating an example of a first pixel group PG1 operating in an LCG mode to obtain phase information. FIG. 15 is a diagram illustrating an example of a time length of a short effective integration time EIT_s compared with a long effective integration time EIT_1.

In FIGS. 6 to 11, it has been described that the first pixel group PG1 operates in the HCG mode to obtain phase information of the third pixel group PG3 in the ULCG mode. However, this is by way of example, and the first pixel group PG1 may operate in another mode.

For example, as illustrated in FIG. 14, the first pixel group PG1 may operate in the LCG mode to obtain phase information of the third pixel group PG3 in the ULCG mode. In this case, a ratio of the time length T_short of the short effective integration time EIT_s to the time length T_long of the long effective integration time EIT_1 may be set in consideration of a ratio of the conversion gain of the LCG capacitor C_lcg to the conversion gain of the ULCG capacitor C_ulcg.

For example, as illustrated in FIG. 15, it will be assumed that the ratio of the conversion gain of the LCG capacitor C_lcg and the conversion gain of the ULCG capacitor C_ulcg is 64 to 1. In this case, the ratio of the time length T_long of the long effective integration time EIT_1 to the time length T_short of the short effective integration time EIT_s may be 64 to 1 or a ratio similar thereto. For example, in FIG. 15, "b" may be 64 or less.

In FIGS. 1 to 15, it has been described that each pixel group includes an HCG capacitor, an LCG capacitor, and a ULCG capacitor and supports a TCG operation. However, this is by way of example only, and example embodiments are not limited thereto. For example, various example embodiments may be applied to an image sensor including an HCG capacitor and an LCG capacitor and supporting a dual conversion gain (DCG) operation, and may also be applied to an image sensor including an HCG capacitor and supporting a single conversion gain (SCG) operation, which will be described in more detail with reference to FIGS. 16 to 22.

FIG. 16 is a diagram illustrating another example of a pixel group, including an HCG capacitor and an LCG capacitor, of the image sensor 100 of FIG. 1. FIGS. 17 and 18A-C are diagrams provided to describe an example of a dual conversion gain (DCG) operation of the pixel group of FIG. 16. For ease of description, it will be assumed that the DCG operation is performed on a third pixel group PG3A. In addition, it will be assumed that a first pixel group PG1 is disposed in the same first column Col1 as the third pixel group PG3A.

Referring to FIG. 16, the third pixel group PG3A may include an HCG capacitor C_hcg and an LCG capacitor C_lcg, but may not include an ULCG capacitor C_ulcg. For example, the third pixel group PG3A may support an HCG mode and an LCG mode.

Accordingly, the image sensor 100 including the third pixel group PG3A of FIG. 16 may perform a DCG operation.

Figure 17:
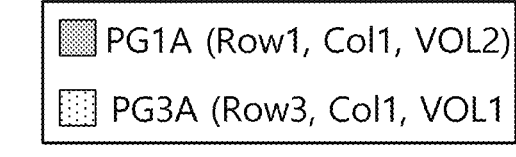
Figure 17:
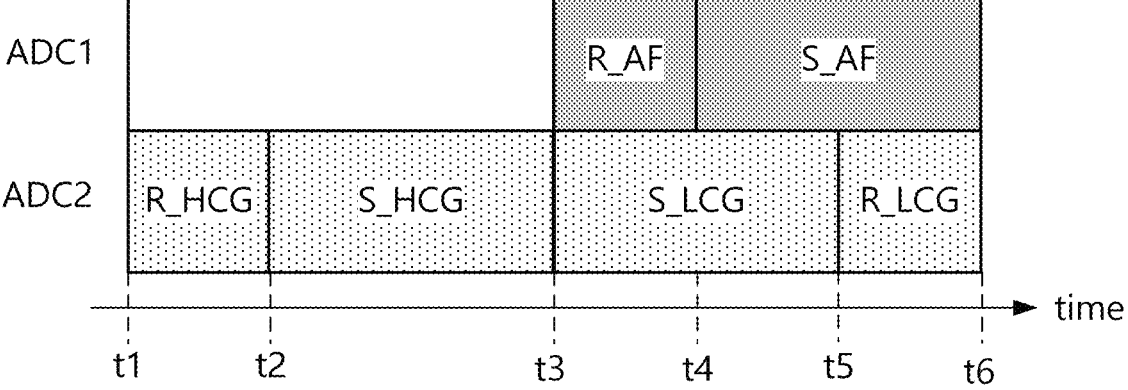

A more detailed description will be provided. As illustrated in FIGS. 17 and 18A, an HCG reset level R_HCG may be sampled in a period between t1 and t2, and a second analog-to-digital converter ADC2 may convert a pixel signal RH corresponding to the HCG reset level R_HCG into a digital signal and may output the converted digital signal. In a period between t2 and t3, an HCG signal level S_HCG may be sampled, and the second analog-to-digital converter ADC2 may convert a pixel signal SH corresponding to the HCG signal level S_HCG into a digital signal and may output the converted digital signal.

In some example embodiments, in a period between t3 and t6, image information of the third pixel group PG3A in the LCG mode may be obtained using the second analog-to-digital converter ADC2, and phase information of the third pixel group PG3A in the LCG mode may be obtained using the first analog-to-digital converter ADC1. In this case, the phase information of the third pixel group PG3A in the LCG mode may be obtained through a first pixel group PG1A disposed in the same column as the third pixel group PG3A.

A more detailed description will be provided. As illustrated in FIGS. 17 and 18B, in a period between t3 and t5, an LCG signal level S_LCG may be sampled, and the second analog-to-digital converter ADC2 may convert a pixel signal SL corresponding to the LCG signal level S_LCG into a digital signal and may output the converted digital signal. In a period between t5 and t6, an LCG reset level R_LCG may be sampled, and the second analog-to-digital converter ADC2 may convert a pixel signal SL corresponding to the LCG reset level R_HCG into a digital signal and may output the converted digital signal.

In another period between t3 and t4, the first analog-to-digital converter ADC1 may be connected to the first pixel group PG1A disposed in the same column as the third pixel group PG3A. The first analog-to-digital converter ADC1 may process an AF reset level R_AF for the first pixel group PG1A. In another period between t4 and t6, the first analog-to-digital converter ADC1 may process the AF signal level S_AF of the first pixel group PG1A. Accordingly, AF information of the selected third pixel group PG3A in the LCG mode may be obtained.

In this case, the first pixel group PG1A may operate in the HCG mode. A ratio of a time length T_short of a short effective integration time EIT_s to a time length T_long of a long effective integration time EIT_1 may be set in consideration of a ratio of a conversion gain of the HCG capacitor C_hcg to a conversion gain of the LCG capacitor C_lcg. For example, as illustrated in FIG. 18C, the ratio of the time length T_long of the long effective integration time EIT_1 to the time length T_short of the short effective integration time EIT_s may be 4 to 1 or a ratio similar thereto. For example, in FIG. 18C, "c" may be 4 or less.

FIG. 19 is a diagram illustrating another example of a pixel group, including an HCG capacitor, of the image sensor 100 of FIG. 1. FIGS. 20 to 22 are diagrams provided to describe an example of an SCG operation of the pixel group of FIG. 19. For ease of description, it will be assumed that the SCG operation is performed on a third pixel group PG3B. In addition, it will be assumed that a first pixel group PG1 is disposed in the same first column Col1 as the third pixel group PG3B.

Referring to FIG. 19, the third pixel group PG3B may include an HCG capacitor C_hcg and may not include other capacitors such as either or both of an LCG capacitor C_lcg and a ULCG capacitor C_ulcg. For example, the third pixel group PG3B may support an HCG mode. Accordingly, the image sensor 100 including the third pixel group PG3B of FIG. 19 may perform an SCG operation.

A more detailed description will be provided with referenced to FIGS. 20 and 21. In a period between t1 and t3, image information of the third pixel group PG3B in the HCG mode may be obtained using a second analog-to-digital converter ADC2, and phase information of the third pixel group PG3B in the HCG mode may be obtained using a first analog-to-digital converter ADC1. In this case, the phase information of the third pixel group PG3B in the HCG mode may be obtained through a first pixel group PG1B disposed in the same column as the third pixel group PG3B.

In this case, the first pixel group PG1A may operate in the HCG mode. A ratio of a time length T_short of a short effective integration time EIT_s to a time length T_long of a long effective integration time EIT_1 may be less than 1, as illustrated in FIG. 22.

As described above, according to example embodiments, an image sensor may more effectively provide an AF function.

While various example embodiments have been shown and described above, it will be apparent to those of ordinary skill in the art that modifications and variations could be made without departing from the scope of the present inventive concept as defined by the appended claims. Furthermore example embodiments are not necessarily mutually exclusive with one another. For example, some example embodiments may include one or more features described with reference to one or more figures, and may also include one or more other features described with reference to one or more other figures.

What is claimed is:

1. An image sensor comprising:
a first pixel group;
a second pixel group in a same column as the first pixel group and in an adjacent row from the first pixel group;
a first analog-to-digital converter and a second analog-to-digital converter corresponding to the first pixel group and the second pixel group, respectively, and configured to process pixel signals output from the first pixel group and the second pixel group, respectively; and
a switching circuit configured to selectively transmit a first pixel signal output from the first pixel group and a second pixel signal output from the second pixel group, to the first analog-to-digital converter or the second analog-to-digital converter, wherein the image sensor is configured to operate such that while the first analog-to-digital converter is connected to the first pixel group to process the first pixel signal,
the second analog-to-digital converter is connected to the second pixel group to process the second pixel signal,
wherein the first pixel signal includes image information corresponding to the first pixel group, and the second pixel signal includes phase information corresponding to the first pixel group, and
wherein the first pixel group and the second pixel group correspond to a same color.

2. The image sensor of claim 1, wherein
a time length of a first effective integration time corresponding to the first pixel group is larger than a time length of a second effective integration time corresponding to the second pixel group.

3. The image sensor of claim 2, wherein
the second effective integration time is set within a non-effective integration time.

4. The image sensor of claim 2, wherein
the first pixel group is configured to output the first pixel signal using charges generated by a first photoelectric conversion element during the first effective integration time, and
the second pixel group is configured to output the second pixel signal using charges generated by a second photoelectric conversion element during the second effective integration time.

5. The image sensor of claim 4, wherein
the time length of the second effective integration time is decreased as a conversion gain of the second pixel group, processing the second pixel signal, is increased.

6. The image sensor of claim 1, wherein
a conversion gain of the first pixel group when outputting the first pixel signal is less than a conversion gain of the second pixel group when outputting the second pixel signal.

7. The image sensor of claim 6, wherein
each of the first pixel group and the second pixel group comprises:
a first capacitor connected to a floating diffusion region;
a second capacitor connected to the floating diffusion region through a first transistor and having a capacitance greater than a capacitance of the first capacitor; and
a third capacitor connected to the floating diffusion region through a second transistor and having a capacitance greater than the capacitance of the second capacitor, and
the second transistor of the first pixel group is configured to turn on when the image sensor is outputting the first pixel signal, and the first transistor and the second transistor of the second pixel group are configured to turn off when the image sensor is outputting the second pixel signal.

8. The image sensor of claim 6, wherein
each of the first pixel group and the second pixel group comprises:
a first capacitor connected to a floating diffusion region;
a second capacitor connected to the floating diffusion region through a first transistor and having a capacitance greater than a capacitance of the first capacitor; and
a third capacitor connected to the floating diffusion region through a second transistor and having a capacitance greater than the capacitance of the second capacitor, and
the second transistor of the first pixel group is configured to be turned on, when the image sensor is outputting the first pixel signal and the first transistor and the transistor second of the second pixel group are configured to be turned on and turned off, respectively, when the image sensor is outputting the second pixel signal.

9. The image sensor of claim 6, wherein
each of the first pixel group and the second pixel group comprises:
a first capacitor connected to a floating diffusion region; and
a second capacitor connected to the floating diffusion region through a first transistor and having a capacitance greater than a capacitance of the first capacitor, and
a second transistor of the first pixel group is configured to be turned on when outputting the first pixel signal, and the second transistor of the second pixel group is configured to be turned off when outputting the second pixel signal.

10. The image sensor of claim 1, wherein
each of the first pixel group and the second pixel group comprises a high conversion gain (HCG) capacitor connected to a floating diffusion region, and
a time length of an effective integration time corresponding to the first pixel group when outputting the first pixel signal is larger than a time length of an effective integration time corresponding to the second pixel group when outputting the second pixel signal.

11. The image sensor of claim 1, wherein
each of the first pixel group and the second pixel group comprises:
a first photoelectric conversion element and a second photoelectric conversion element that share a single microlens; and
a first transfer transistor and a second transfer transistor, respectively connected to the first photoelectric conversion element and the second photoelectric conversion element, and
the first transfer transistor and the second transfer transistor that are included in the second pixel group are configured to be turned on at different points in time.

12. The image sensor of claim 1, wherein
the switching circuit comprises:
a first switch configured to electrically connect or disconnect the first pixel group and the first analog-to-digital converter to or from each other;
a second switch configured to electrically connect or disconnect the second pixel group and the first analog-to-digital converter to or from each other;
a third switch configured to electrically connect or disconnect the first pixel group and the second analog-to-digital converter to or from each other; and
a fourth switch configured to electrically connect or disconnect the second pixel group and the second analog-to-digital converter to or from each other.

13. An image sensor comprising:
a pixel array including a plurality of pixel groups arranged along a same column;
an analog-to-digital converting block including a plurality of analog-to-digital converters configured to receive pixel signals output from the plurality of pixel groups and to convert the received pixel signals into digital signals; and
a switching circuit configured to connect the plurality of pixel groups to the plurality of analog-to-digital converters,
wherein
the image sensor is configured to operate such that a first period in which a first analog-to-digital converter among the plurality of analog-to-digital converters is connected a selected pixel group among the plurality of pixel groups so as to perform a first processing operation at least partially overlaps a second period in which a second analog-to-digital converter among the plurality of analog-to-digital converters is connected to an adjacent pixel group that is arranged in a row different from a row of the selected pixel group so as to perform a processing operation,
wherein the first analog-to-digital converter is configured to process a first pixel signal received from the selected pixel group, and the second analog-to-digital converter is configured to process a second pixel signal received from the adjacent pixel group, and
wherein the first pixel signal includes image information corresponding to the selected pixel group, and the second pixel signal includes phase information corresponding to the selected pixel group,
wherein the selected pixel group and the adjacent pixel group correspond to a same color.

14. The image sensor of claim 13, wherein
a time length of a first effective integration time, corresponding to the selected pixel group, is longer than a time length of a second effective integration time corresponding to the adjacent pixel group.

15. The image sensor of claim 14, wherein the second effective integration time is set within a non-effective integration time.

16. The image sensor of claim 13, wherein a conversion gain of the selected pixel group when outputting the first pixel signal is less than a conversion gain of the adjacent pixel group when outputting the second pixel signal.

17. A method of operating an image sensor, the method comprising:

obtaining image information on a selected pixel group from among a plurality of pixel groups; and obtaining phase information on the selected pixel group using an adjacent pixel group arranged in a same column as the selected pixel group and in a row, different from a row of the selected pixel group, from among the plurality of pixel groups, wherein a first period in which the image information on the selected pixel group is obtained at least partially overlaps a second period in which the phase information on the selected pixel group is obtained, the selected pixel group is obtained, wherein the selected pixel group and the adjacent pixel group correspond to a same color.

18. The method of claim 17, further comprising:

generating charges by first photoelectric conversion elements that are included in the selected pixel group, during a first effective integration time; and generating charges by second photoelectric conversion elements that are included in the adjacent pixel group, during a second effective integration time shorter than the first effective integration time, wherein the second effective integration time is set within a non-effective integration time.

* * * * *